US011880788B1

(12) United States Patent
Ho et al.

(10) Patent No.: US 11,880,788 B1
(45) Date of Patent: Jan. 23, 2024

(54) METHODS AND SYSTEMS FOR MANAGING RETAIL EXPERIENCE

(71) Applicant: Block, Inc., San Francisco, CA (US)

(72) Inventors: Veronica Ho, Oakland, CA (US); Matthew Haehl, New York, NY (US); Saqi Mehta, San Francisco, CA (US); Stephanie Snyder, San Francisco, CA (US)

(73) Assignee: Block, Inc., Oakland, CA (US)

( * ) Notice: Subject to any disclaimer, the term of this patent is extended or adjusted under 35 U.S.C. 154(b) by 710 days.

(21) Appl. No.: 15/390,119

(22) Filed: Dec. 23, 2016

(51) Int. Cl.
*G06Q 10/0631* (2023.01)
*G06Q 10/0639* (2023.01)

(52) U.S. Cl.
CPC ......... *G06Q 10/063112* (2013.01); *G06Q 10/06398* (2013.01)

(58) Field of Classification Search
CPC ........ G06Q 10/063112; G06Q 10/06398
See application file for complete search history.

(56) References Cited

U.S. PATENT DOCUMENTS

| | | | |
|---|---|---|---|
| 5,819,231 A | 10/1998 | Tremaine |
| 5,878,337 A | 3/1999 | Joao et al. |
| 6,571,218 B1 | 5/2003 | Sadler |
| 6,873,964 B1 | 3/2005 | Williams et al. |
| 7,209,891 B1 | 4/2007 | Addy et al. |
| 7,764,185 B1 | 7/2010 | Manz et al. |
| 7,810,729 B2 | 10/2010 | Morley, Jr. |
| 7,870,028 B2 | 1/2011 | Kloubakov et al. |
| 8,001,057 B1 | 8/2011 | Hill |
| 8,442,208 B2 | 5/2013 | Shaffer et al. |
| 8,478,618 B2 | 7/2013 | Coleman et al. |
| 8,601,002 B1 | 12/2013 | Ali et al. |
| 9,064,285 B1 | 6/2015 | Nathoo |
| 9,727,827 B2 | 8/2017 | Hyder et al. |
| 9,818,087 B2 | 11/2017 | Cooper et al. |
| 9,824,323 B1* | 11/2017 | Weiss ............... G06Q 10/06398 |

(Continued)

FOREIGN PATENT DOCUMENTS

| | | |
|---|---|---|
| AU | 2018201228 A1 | 3/2018 |
| EP | 0 993 191 A2 | 4/2000 |

(Continued)

OTHER PUBLICATIONS

Non-Final Office Action dated May 30, 2019, for U.S. Appl. No. 14/754,909, of Tsou, V., filed Jun. 30, 2015.

(Continued)

*Primary Examiner* — Deirdre D Hatcher
(74) *Attorney, Agent, or Firm* — Lee & Hayes, P.C.

(57) ABSTRACT

Geo-fences may be dynamically reconfigured to identify employees that may be of particular interest to users. In some instances, a geo-fence may be defined for a particular user based on a variety of information, in order to identify employees that may be of interest to the user and that are located within proximity to the user. The system may identify employees based on a confidence score that a particular employee or set of employees may have assisted the user during the shopping process. Information regarding the identified employees may be displayed or otherwise output to notify the user of nearby employees that may be of interest, for example in the form of an interactive digital receipt.

20 Claims, 11 Drawing Sheets

(56) References Cited

U.S. PATENT DOCUMENTS

| | | |
|---|---|---|
| 9,882,914 B1 | 1/2018 | Co |
| 10,515,342 B1 | 12/2019 | Haley |
| 10,783,554 B1* | 9/2020 | Hylton .............. G06Q 30/0259 |
| 10,867,291 B1 | 12/2020 | Yien et al. |
| 11,087,412 B1 | 8/2021 | Ho et al. |
| 2002/0022982 A1 | 2/2002 | Cooperstone et al. |
| 2003/0120531 A1 | 6/2003 | Parker |
| 2003/0204447 A1 | 10/2003 | Dalzell et al. |
| 2005/0192823 A1 | 9/2005 | Kuhn et al. |
| 2006/0047530 A1 | 3/2006 | So et al. |
| 2006/0138219 A1 | 6/2006 | Brzezniak et al. |
| 2006/0243798 A1 | 11/2006 | Kundu et al. |
| 2007/0038503 A1 | 2/2007 | Krajcev et al. |
| 2007/0039024 A1 | 2/2007 | Krajcev et al. |
| 2007/0204156 A1 | 8/2007 | Jeghers |
| 2007/0208572 A1 | 9/2007 | Habichler et al. |
| 2007/0233540 A1 | 10/2007 | Sirota |
| 2007/0239468 A1 | 10/2007 | O'Brien et al. |
| 2007/0272734 A1 | 11/2007 | Lipton et al. |
| 2008/0071634 A1 | 3/2008 | Rampell et al. |
| 2008/0120129 A1 | 5/2008 | Seubert et al. |
| 2008/0177624 A9 | 7/2008 | Dohse |
| 2008/0197188 A1 | 8/2008 | Jagatic et al. |
| 2008/0255929 A1* | 10/2008 | Mouton ................ G06Q 30/02 705/7.32 |
| 2008/0306750 A1 | 12/2008 | Wunder et al. |
| 2009/0005987 A1* | 1/2009 | Vengroff .............. H04W 4/024 701/300 |
| 2009/0094239 A1 | 4/2009 | Sabol et al. |
| 2009/0144102 A1 | 6/2009 | Lopez |
| 2009/0210331 A1 | 8/2009 | Boone et al. |
| 2009/0303040 A1 | 12/2009 | Srinivasa et al. |
| 2009/0320088 A1 | 12/2009 | Gill et al. |
| 2010/0159909 A1* | 6/2010 | Stifelman ......... H04M 1/72469 455/418 |
| 2010/0211469 A1 | 8/2010 | Salmon et al. |
| 2010/0269059 A1 | 10/2010 | Othmer et al. |
| 2011/0131105 A1 | 6/2011 | Aonuma et al. |
| 2012/0130774 A1* | 5/2012 | Ziv ................ G06Q 10/06393 705/7.39 |
| 2012/0173570 A1 | 7/2012 | Golden |
| 2012/0266258 A1 | 10/2012 | Tuchman et al. |
| 2013/0067547 A1 | 3/2013 | Thavasi et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151705 A1 | 6/2013 | Menon et al. |
| 2013/0159154 A1 | 6/2013 | Purves et al. |
| 2013/0246207 A1 | 9/2013 | Novak et al. |
| 2013/0246301 A1 | 9/2013 | Radhakrishnan et al. |
| 2013/0262479 A1* | 10/2013 | Liang ................ G06F 16/24578 707/748 |
| 2013/0301820 A1 | 11/2013 | Williams et al. |
| 2013/0311836 A1 | 11/2013 | Hurst et al. |
| 2013/0325734 A1 | 12/2013 | Bixler et al. |
| 2014/0032382 A1 | 1/2014 | Hamann et al. |
| 2014/0108113 A1* | 4/2014 | O'Connor .............. G06Q 20/20 705/14.16 |
| 2014/0114877 A1* | 4/2014 | Montano ............ G06Q 30/016 705/347 |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0201001 A1 | 7/2014 | Rellas et al. |
| 2014/0201100 A1 | 7/2014 | Rellas et al. |
| 2014/0207500 A1 | 7/2014 | Krajcev et al. |
| 2014/0258161 A1 | 9/2014 | Brown et al. |
| 2014/0279102 A1 | 9/2014 | Hartman et al. |
| 2014/0297556 A1* | 10/2014 | Ryan ................ G06Q 30/0615 705/346 |
| 2014/0358803 A1 | 12/2014 | Carter et al. |
| 2015/0025929 A1* | 1/2015 | Abboud .......... G06Q 10/063114 705/7.15 |
| 2015/0149254 A1* | 5/2015 | Sakamoto .......... G06Q 10/0633 705/7.34 |
| 2015/0161665 A1* | 6/2015 | Grimes .............. G06Q 30/0261 705/14.53 |
| 2015/0172327 A1* | 6/2015 | Wansley ................ G06Q 50/01 715/753 |
| 2015/0213413 A1 | 7/2015 | Faron et al. |
| 2015/0242922 A1 | 8/2015 | Zamer |
| 2015/0269508 A1 | 9/2015 | Damboritz et al. |
| 2015/0278829 A1* | 10/2015 | Lu .......................... H04W 4/029 705/7.29 |
| 2015/0332242 A1 | 11/2015 | Perry et al. |
| 2015/0348003 A1* | 12/2015 | Reader ................... G06Q 30/02 705/16 |
| 2016/0055322 A1 | 2/2016 | Thomas |
| 2016/0071038 A1 | 3/2016 | Puttaswamy et al. |
| 2016/0071121 A1* | 3/2016 | Gestetner ........... G06Q 30/0203 705/7.32 |
| 2016/0171516 A1* | 6/2016 | Brosnan .............. G06Q 30/0214 705/14.16 |
| 2016/0217470 A1 | 7/2016 | Gerard et al. |
| 2016/0224205 A1 | 8/2016 | Fulton |
| 2016/0239806 A1 | 8/2016 | Benham et al. |
| 2016/0328715 A1 | 11/2016 | Gideoni et al. |
| 2016/0379202 A1* | 12/2016 | Turner ................. G06Q 20/387 705/39 |
| 2017/0053330 A1* | 2/2017 | Smith ................ G06Q 30/0613 |
| 2017/0093952 A1* | 3/2017 | Kumar .................... H04L 51/18 |
| 2017/0161745 A1* | 6/2017 | Hawkins ............. G06Q 20/3224 |
| 2017/0279903 A1* | 9/2017 | Mimassi ................. H04L 67/18 |
| 2017/0285911 A1* | 10/2017 | White ............... G06F 16/24578 |
| 2017/0316382 A1 | 11/2017 | Colner |
| 2018/0122028 A1* | 5/2018 | Pattekar .......... G06Q 10/06395 |
| 2018/0260768 A1 | 9/2018 | Ng et al. |
| 2019/0258818 A1 | 8/2019 | Yu et al. |
| 2021/0035055 A1 | 4/2021 | Ng et al. |

FOREIGN PATENT DOCUMENTS

| | | | |
|---|---|---|---|
| WO | 02/44981 A1 | 6/2002 | |
| WO | WO-2013181017 A2 * | 12/2013 | ......... G06Q 30/0603 |
| WO | 2016/011287 A1 | 1/2016 | |
| WO | 2018/164839 A1 | 9/2018 | |

OTHER PUBLICATIONS

Non-Final Office Action dated Jun. 14, 2019, for U.S. Appl. No. 15/454,892, of Ng, C., et al., filed Mar. 9, 2017.

Second Examination Report for Australian Patent Application No. 2018201228, dated Jul. 15, 2019.

Final Office Action dated Jul. 30, 2019, for U.S. Appl. No. 15/476,740, of Ho, V., et al., filed Mar. 31, 2017.

Notice of Allowance dated Aug. 2, 2019, for U.S. Appl. No. 15/630,769, of Haley, E., filed Jun. 22, 2017.

Non-Final Office Action dated Aug. 9, 2019, for U.S. Appl. No. 16/203,545, of Yien, K., et al., filed Nov. 28, 2018.

Non-Final Office Action dated Jan. 10, 2019, for U.S. Appl. No. 15/630,769 of Haley, E., filed Jun. 22, 2017.

First Examination Report for Australian Patent Application No. 2018201228, dated Feb. 26, 2019.

Non-Final Office Action dated Mar. 4, 2019, for U.S. Appl. No. 15/476,740 of Ho, V., et al., filed Mar. 31, 2017.

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

Myres, L., "The Mac Security Blog: What is Multi-Factor Authentication, and How Will It Change in the Future?," Intego, dated Aug.

(56) References Cited

OTHER PUBLICATIONS 17, 2012, Retrieved from the Internet URL: http://www.intego.com/mac-security-blog/what-is-multi-factor-authentication-and-how-will-it-change-in-the-future/, on Nov. 11, 2014, pp. 1-4.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Oct. 28, 2014, for U.S. Appl. No. 14/334,422, of Nathoo, A., filed Jul. 17, 2014.
Notice of Allowance dated Feb. 18, 2015, for U.S. Appl. No. 14/334,422, of Nathoo, A., filed Jul. 17, 2014.
Non-Final Office Action dated Mar. 2, 2015, for U.S. Appl. No. 14/177,177, of Brock, Z., et al., filed Feb. 10, 2014.
Final Office Action dated Oct. 19, 2015, for U.S. Appl. No. 14/177,177, of Brock, Z., et al., filed Feb. 10, 2014.
First Examination Report for Australian Patent Application No. 2015289554, dated Feb. 21, 2017.
Examiner Requisition for Canadian Patent Application No. 2,955,452, dated Dec. 29, 2017.
Second Examination Report for Australian Patent Application No. 2015289554, dated Feb. 8, 2018.
Non-Final Office Action dated Feb. 28, 2018, for U.S. Appl. No. 14/754,909, of Tsou, V., filed Jun. 30, 2015.
Final Office Action dated Jul. 16, 2018, for U.S. Appl. No. 14/754,909, of Tsou, V., filed Jun. 30, 2015.
Examiner Requisition for Canadian Patent Application No. 2,955,452, dated Oct. 23, 2018.
International Search Report and Written Opinion for International Application No. PCT/US2015/040800, dated Oct. 30, 2015.
International Search Report and Written Opinion for International Application No. PCT/US2018/018950, dated Apr. 12, 2018.
Advisory Action dated Sep. 27, 2019, for U.S. Appl. No. 15/476,740, of Ho, V., et al., filed Mar. 31, 2017.
Final Office Action dated Oct. 17, 2019, for U.S. Appl. No. 14/754,909, of Tsou, V., filed Jun. 30, 2015.
Non-Final Office Action dated Dec. 2, 2019, for U.S. Appl. No. 15/454,892, of Ng, C., et al., filed Mar. 9, 2017.
Final Office Action dated Dec. 13, 2019, for U.S. Appl. No. 16/203,545, of Yien, K., et al., filed Nov. 28, 2017.
Advisory Action dated Dec. 19, 2019, for U.S. Appl. No. 14/754,909, of Tsou, V., filed Jun. 30, 2015.
Examiner Requisition for Canadian Patent Application No. 2,955,452, dated Oct. 7, 2019.
Notice of Allowance dated Sep. 22, 2020, for U.S. Appl. No. 16/203,545, of Yien, K., et al., filed Nov. 28, 2018.
Final Office Action dated Oct. 28, 2020, for U.S. Appl. No. 15/476,740, of Ho, V., et al., filed Mar. 31, 2017.
Advisory Action dated Jan. 6, 2021, for U.S. Appl. No. 15/476,740, of Ho, V., et al., filed Mar. 31, 2017.
Osibanjo et al., "Compensation Packages: A Strategic Tool for Employees Performance and Retention", Leonardo Journal of Science, Issue 25, 25 pages (Jul.-Dec. 2014).
Notice of Allowance dated Mar. 22, 2021, for U.S. Appl. No. 15/476,740, of Ho, V., et al., filed Mar. 31, 2017.
Corrected Notice of Allowability dated Jul. 9, 2021, for U.S. Appl. No. 15/476,740, of Ho, V., et al., filed Mar. 31, 2017.
Examiner Requisition for Canadian Patent Application No. 2,955,452, dated May 25, 2021.
Examiner Requisition for Canadian Patent Application No. 2,955,452, dated May 25, 2022.
Notice of Allowance dated Jun. 10, 2020, for U.S. Appl. No. 15/454,892, of Ng, C., et al., filed Mar. 9, 2017.
Notice of Acceptance for Australian Patent Application No. 2018201228 dated Feb. 21, 2020.
Non-Final Office Action dated Mar. 23, 2020, for U.S. Appl. No. 15/476,740, of Ho, V., et al., filed Mar. 31, 2017.
Non-Final Office Action dated May 18, 2020, for U.S. Appl. No. 16/203,545, of Yien, K., et al., filed Nov. 28, 2018.
Notice of Grant for Australian Patent Application No. 2018201228 dated Jun. 18, 2020.

\* cited by examiner

METHODS AND SYSTEMS FOR MANAGING RETAIL EXPERIENCE

BACKGROUND

Some retail stores extend across tens of thousands of square feet and offer thousands of items for sale. Many consumers visit such retail stores when shopping for a diverse set of items such as groceries, office supplies, and household wares. Typically, these stores can have dozens of aisles and/or departments and customers. Customers may have a difficult time finding products in stores. Often, stores move the products around, which makes locating specific products difficult. Also, stores are not standardized with respect to the location of products, so knowing the location of the product in one store does not mean that the customer will be able to find the product in another store. Customers may become frustrated with the inability to locate products in a store and leave without purchasing anything. To further complicate the issue of finding products in stores, stores often run out of stock of certain products so even if a customer knows where the product should be located, it may not be there when the customer arrives. Store managers may designate certain employees to help customers when need arises or assign employees in certain sections of the stores to answer the questions of the customers, however generally no incentives exist to reward employees who assist customers and even if such techniques exist, they mostly rely on a description of the employee that a customer provides.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
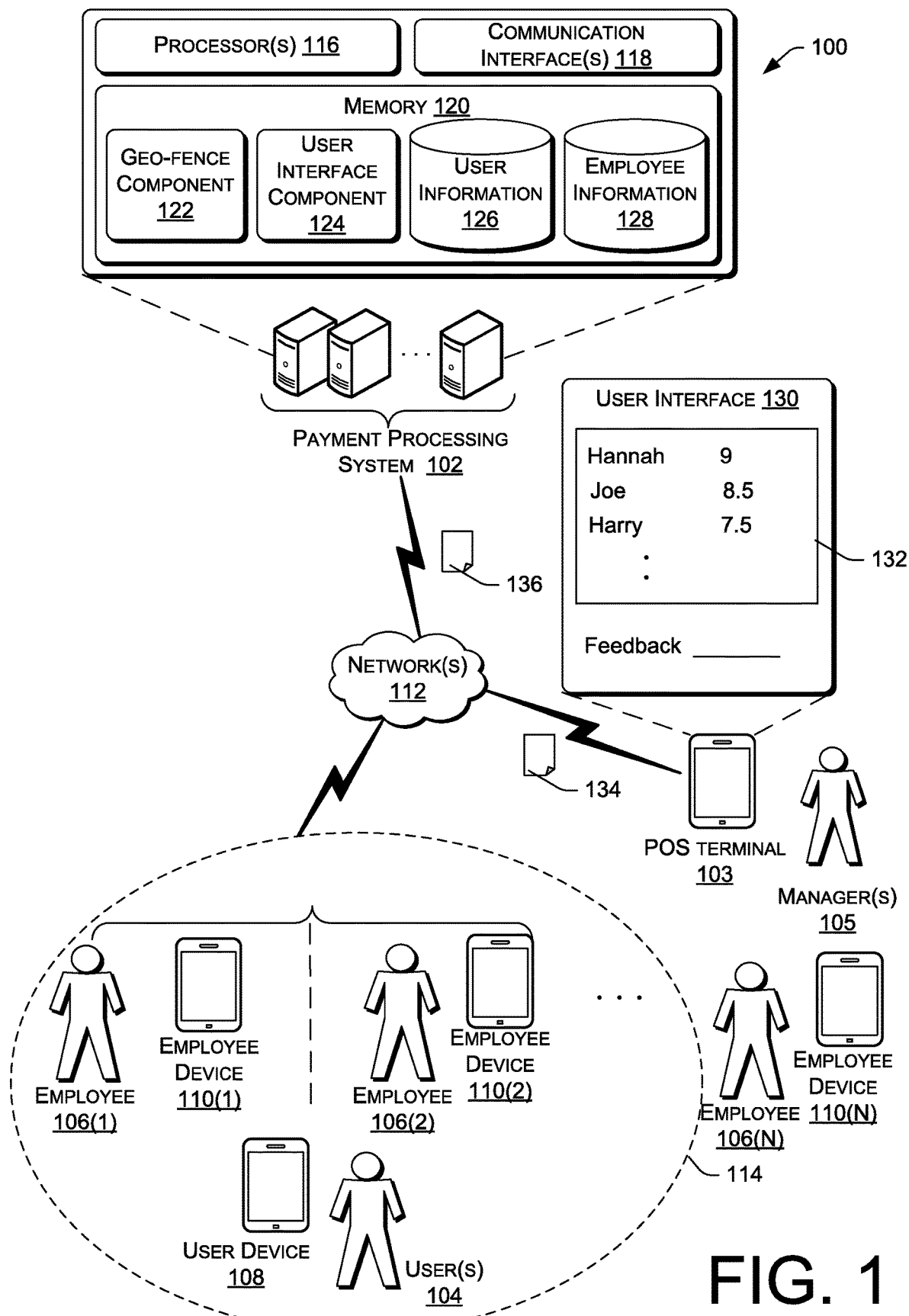
FIG. 1 illustrates an example environment for dynamically reconfiguring geo-fences to identify employees that may be of particular interest to users.

The present subject matter discloses processes, methods and systems to assist customers in locating an item in a store while tracking the customer's movement through the store and using customer location to determine, with reasonable accuracy, identities of the employees assisting the customer. Some implementations described herein include techniques and arrangements for rendering incentives, such as a bonus, an adjusted compensation, or other rewards, to an employee that has or was most likely to have assisted a customer with a purchase transaction at a store, without burdening the customer with the responsibility of describing the employee at the time of check out. In one implementation, the likelihood of correctly determining or predicting an employee who may have assisted a customer can be based on configuring a geo-fence, such as a perimeter, around the customer to include the employee closest to them. The geo-fence may be dynamically reconfigured as the customer moves from one location to another location within the store and/or based on products being purchased by the customers. The size of a geo-fence may be based on a communication protocol, such as limits of the Bluetooth communication protocol on which a customer device connected to customer In some instances, the techniques may define a geo-fence for a particular customer based on a variety of information, in order to identify employees that are likely to assist the customer, information such as employees located within proximity to the customer and/or the product being purchased by the customer. In some instances, certain products may be associated with employees. For example, if an employee is asked to serve a certain aisle of products, and the customer is purchasing a product from the aisle, it may be deduced with a certain confidence score, through disclosed system and method, that the customer was assisted by a specific employee assigned to that aisle. Additionally, or alternatively, if the geo-fence of the customer coincides with the employee or aisle, the system may further increase the confidence score. The geo-fence may also be defined based on proximity of an employee with a customer where proximity is based on a predetermined threshold distance or time of interaction between a customer and an employee based on how long the employee and the customer reside within a geo-fence or in proximity to each other. Furthermore, the geo-fence can also track whether an employee enters and exits and re-enters a geo-fence including a customer.

According to some implementations, the geo-fence can also be defined based on a customer's purchase history, places, such as departments or aisles, that were frequented by the customer in the store, a movement route and any patterns embedded therein, wait time associated with a product being fetched by an employee and handed over to a customer, customer preferences, or a variety of other information. For example, a geo-fence may encompass locations the customer is likely to visit (e.g., in view of previously visited locations by other customers) or locations that the customer is able to visit (e.g., due to a moving path of an employee in proximity to the customer). When the customer is requested to identify the employee assisting the customer with a product or service, the server generates a list of possibilities for the customer to choose from. The possibilities are based on analysis of interaction data between the customer and the employees while shopping. The interaction data, as mentioned before, can be based on geo-fences including the employee and the customer. Information regarding employees may be displayed or otherwise output to notify the customer of employees that may have been most likely to assist the customer. Such information can be displayed for the customer at the time of check out, for example, on a point-of-sale terminal, or at a later time on a digital receipt, for example, accessible to the customer on his or her personal device. The customer can interact with the digital receipt to select from the options presented on the user interface to indicate which amongst the presented employees assisted with the purchase, product or service. The server can generate the options and order them based on confidence scores and present a subset of employees at a time so as to not overwhelm the customer with options. Details of the implementations are described in the following paragraphs.

Generally, retail purchase transactions in a store generally involve a customer and a store employee. The customer enters the store, selects one or more products or services to be purchased, and brings them to a checkout stand, where the employee determines the total price (including any applicable taxes, service fees, etc.), typically using a cash register or similar system, and collects the payment from the customer. Payment can be made using various media such as cash; a check; or a purchase card such as a credit card, debit card, or prepaid card (e.g., gift card or gift certificate). A receipt, such as a paper receipt and/or a digital receipt, is given to the customer identifying details of the product or service being purchased, the customer can then leave the store with the purchased product(s). Some stores also provide self-service checkout kiosks, where a customer can determine the total price of the products and pay without direct intervention of a store employee.

In the current environments in stores and facilities, signs are posted to indicate the location of groups of items, like crackers or detergents or light bulbs. Even though these signs may be helpful in locating these common items, customers may still wander through the store or facility trying to find an item, for example a specific item on the aisle of detergents. Also, some items may not be where they are supposed to be or may be out of stock. As the size of grocery stores, retail stores, home improvement stores, warehouse-type stores and other facilities have increased over the last several years, the problem for a customer to locate an item has dramatically increased. After wandering around looking for an item, the customer just leaves the store or facility in frustration, without the item.

Some stores dedicate additional workforce to assist the customers in finding an item or to provide alternatives. The employees may be assigned to each aisle or department and may be able to assist with products or services that are not in their assigned area. Since the employees are engaged in a one-to-one interaction with a customer, it may be beneficial to reward the employees with their efforts. However, generally, the burden to identify and credit the employees assisting the customers lies with the customers at the time of check out since the floor or assisting associates are usually different from the cashiers or check-out employees behind the counter that ultimately collect the payment from the customer.

For at least the reasons mentioned above, the present embodiments disclose methods and systems to enhance retail management and tracking of employee performance especially of those employees that are locating items for a customer or otherwise assisting the customer with their retail experience.

While the methods and systems are explained from the perspective of a customer receiving positive retail experience and a helping associate being rewarded for such efforts, it will be understood that the same methods and systems can be used to determine identity of an employee likely to have caused a negative retail experience for a customer. Furthermore, the identification can easily be extended in other environments, such as an office environment, restaurant environment, or any other service based industry.

In a retail world, according to an implementation, the products or items have location sensors, such as radio frequency identification (RFID) tags. Additionally or operationally, the items may have Bluetooth Low Energy (BLE) tags, that operate on BLE Beacon technology. A manufacturer, a distributor or a retailer attaches a Radio Frequency Identification (RFID) tag on each product to identify and track their merchandise. By the transmission and reception of radio signals to and from the RFID tag on the product, the product can be tracked from the time of manufacture to the time of sale without any direct visual or physical contact with the product being monitored. In one implementation, the RFID tag information includes an RFID tag of a product includes (1) a retail SKU number (e.g., a universal product code) identifying the name, manufacturer and/or suggested price of the product, (2) a unique serial number identifying the product, (3) the SKU number and the unique serial number or (4) the aisle where the item is ideally placed, for example: apparel, snacks, perishable, etc. An RFID tag on a product includes an antenna and a silicon chip containing modulation circuits, control logic and non-volatile memory. The silicon chip derives electrical power from radio signals received by the antenna or from a battery, and is able to exchange data with, for example, a payment processing system, by demodulating and modulating the radio signals. The non-volatile memory of the RFID tag typically has a storage capacity of 5 to 256 bytes. The payment processing system, including the RFID scanner, can read and write to and from the memory of the RFID tag using radio signal transmission.

The location sensors can also be associated with aisles or the shelves where items are placed. The aisle sensors can be used to create an environment specific to the location. For example, the aisle sensors in the cold storage section can control the temperature to be below a certain value.

In a similar manner, the devices associated with the customers and the employees (including wearable devices) may be configured to report their location when requested. The devices may include location sensors, such as global positioning units, RFID units, BLE beacons, etc., to indicate the location of the customer and the employee, and also with respect to each other and other items or aisles.

The customer device can be used to create the geo-fence around the customer. Furthermore, signals from the items, devices of the employees and aisles can be used to selectively include or exclude employees from being considered at the time of identification. In some cases, the devices of the customer and the employee can include user interfaces to help the customer or the employee to locate the item.

In a retail environment, the customer enters a store and allows access to the location services offered by the device connected to them. To find an item, the customer may utilize an electronic device to request information from a payment processing system regarding items that are in proximity to the customer. The request may also specify a desired attribute for the items, such as a particular rating, category of items, price range, and so on. In response to receiving the request, the payment processing system may determine a current location of the item or an employee available to assist. The payment processing system may also determine one or more portions of a geographical region that surrounds the current location of the customer based on information related to the item or the geographical region of the employee available to assist or otherwise designated to the aisle where the item is located. The one or more portions of the geographical region may each include a perimeter that defines a geo-fence. The payment processing system may then identify employees that are located within the one or more portions of the geographical region, such as aisles or sections of the store, for example based on signals received by devices within the geographical region or based on pre-assignment of an employee to that aisle that a certain employee should be in that geographical region. The payment processing system may provide information regarding the employees to the electronic device of the customer or the interface of a point-of-sale (POS) terminal at the time of check out, so that the customer may identify employees that are located within proximity and that may be of interest to the customer, for example to provide a positive or negative review for the employee or otherwise contact at the time of check out or during a later visit. Although in some instances the techniques are described as being performed by the payment processing system remotely connected to the POS terminal, the techniques may alternatively, or additionally, be performed by an electronic device associated with a customer or any other computing device.

The payment processing system may utilize various types of information as mentioned above to generate a list of employees that may be of interest to the user. The information may be displayed or otherwise output to the user via the electronic device at the time of check out or at a later time on an interactive digital receipt. Once the customer identifies an employee from a list of employees, the payment processing system can incentivize or communicate with the employee based on the review provided by the customer.

In one illustration, the payment processing system may identify the locations that have been most frequented by the user (e.g., places that have been visited more than a threshold number of times) and/or employees operating in the area. The payment processing system then identifies the employees most likely to have assisted the customer and associate employees with a level of certainty, say in terms of confidence score Alternatively, or additionally, the payment processing system may utilize a speed or direction of travel of the customer and employee, a navigation or transportation route (e.g., route within the store) and/or interaction time between the customer and the employee to generate a confidence score corresponding to the employee.

In yet another illustration, the payment processing system may also take analyze historical data and interactions of the employees with the same customer or other customers to determine or adjust the confidence score. The interactions can be tracked based on the time the employee and customer spend with each other as reported by the location sensors of associated devices.

Thus, by determining one or more portions of a geographical region from various types of information and dynamically control the perimeter of the geographical region as the customer moves and customer-employee interaction varies, the payment processing system may intelligently identify employees that may be of interest to the customer. This may ultimately enhance the customer's experience in finding items quickly and identify the employees that are either responsive or non-responsive to their questions. Further, by intelligently identifying one or more portions of a geographical region, and associated floor employees or sales people, the techniques may reduce the amount of input provided by the customer during the check-out process for when the customer must search through a randomized list of employees in which they may have interacted with (e.g., avoid the customer from further specifying the types of employees that are of interest). This may conserve battery life and/or processing resources of the point of sale system and expedite the check-out process for the customer and merchant. Furthermore, examples of the present invention provide technical improvements over prior methods through utilization of geo-location data associated with items purchased, floor associates, and customers to intelligently recommend employees that may have participated in the sales process.

In many examples discussed herein, a payment processing system may intelligently identify employees based on objective factors, such as locations a user has previously visited, employees that have previously assisted the user, and so on. Here, the employees may be identified without determining a confidence score. However, in other examples a more subjective approach may be taken that determines the confidence of score of the employees.

Thus, the store manager, using the techniques described herein, does not need to request the customer to describe the employee who may have positively or negatively impacted the customer. The entire process of detection, tracking, and reporting of employees of interest to the customer is automated and data from such processes is collated and analyzed in real-time or at a later time based on user or store preferences.

For discussion purposes, some example implementations are described below with reference to the corresponding figures. However, implementations herein are not limited to the particular examples provided, and may be extended to other environments, other system architectures, other types of employees, and so forth, as will be apparent to those of skill in the art in light of the disclosure herein.

While the embodiments described herein may relate to brick-and-mortar retails stores using POS terminals, including self-checkout terminals, it will be understood that the embodiments can be extended to shopping at any e-commerce location, including online shopping via an employee websites or applications.

Various embodiments and implementations of the disclosed technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, an employee may include any business engaged in the offering of goods or services for acquisition by buyers. Actions attributed to an employee may include actions performed by owners, employees, or other agents of the employee and thus no distinction is made herein unless specifically discussed. In addition, as used herein, a buyer may include any entity that acquires goods or services from an employee, such as by purchasing, renting, leasing, borrowing, licensing, or the like. Hereinafter, goods and/or services offered by employees may be referred to as items. Thus, an employee and a buyer may interact with each other to conduct a transaction in which the buyer acquires an item from an employee, and in return, the buyer provides payment to the employee, for example through a biometric payment instrument.

As used herein, a 'payment transaction' or simply 'transaction' may include a financial transaction for the acquisition of goods and/or services that is conducted between a buyer and an employee. For example, when paying for a transaction, the buyer can provide the amount that is due to the employee using a payment proxy. In other cases, the payment transaction includes transfer of money from one party to another for any number of reasons. Thus, while the description refers to as buyer and employee as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or employee's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The payment object reader may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader may include hardware implementation, such as slots, magnetic tracks, and rails with one or more sensors or electrical contacts to facilitate detection and acceptance of a payment object. Additionally, or optionally, the payment object reader may also include a biometric sensor to receive and process biometric characteristics and process them as payment instruments, given that such biometric characteristics are registered with the payment processing system and connected to a financial account.

In one example, the POS terminal can be a hand-held computing device such as a mobile phone, laptop, tablet computer, and the like, associated with an employee. In another example, the POS terminal is a mobile computing device that is wearable or otherwise connected to or associated with the buyer or employee such as an Apple® watch or a Fitbit® for example.

The term "attest security" or "attestation of a device" is intended to mean methods to determine whether a hardware or software has been modified from its original or factory configuration. For example, systems can identify unauthorized changes to software, including users tampering with their software to circumvent technological protection measures. It works by having the hardware generate a certificate stating what software is currently running. The computer can then present this certificate to a remote party to show that unaltered software is currently executing.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired." The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender.

The term "registration application" or "mobile payment portal" as used here, refers to any messaging application that enables communication between users (e.g., sender and recipient of a message) over a wired or wireless communications network. A payment processing system that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment processing system for processing. The payment processing system identifies a recipient associated with the input (or payment proxy) that is derived from the TO field, and further identifies a recipient financial account associated with that recipient. Upon identification of the recipient financial account, the payment processing system initiates the transfer of money.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "swipe" here refers to any manner of triggering a payment object reader to read data from a payment object, such as by swiping, inserting, tapping, hovering, bringing in close contact or passing the payment object into or through a payment object reader.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1 illustrates an example environment 100 for dynamically configuring and reconfiguring geo-fences around a customer, employee, or an item of interest to identify employees that may be of particular interest to customers or likely to have been associated with the customer with their retail experience. The experience may either be positive or negative and accordingly, the disclosed systems help identify, with reasonable certainty, the employee who may have caused the positive or negative experience. Accordingly, the identified employee may be approached based on the feedback. The environment 100 may enable a payment processing system 102 to determine one or more portions of a geographical region that surrounds one or more customer or users 104 (hereinafter "the user 104") as they enter the store and provide permission to track their movement while they shop. The store, according to one implementation, includes the users 104 associated with user device(s) 103, the employees 106(1)-(N), associated with respective devices, such as phones or wearable devices, and a point-of-sale (POS) terminal 108 having a user interface 130. The POS terminal 108 may be operated by another employee, hereinafter referred to as manager, or may even be a self-checkout kiosk. As shown, a geo-fence 114, in other words, a geographic perimeter, facilitates in determining, with considerable certainty, identification of employees who may have interacted with the user. Evidently, employees may fall in and out of the user's geo-fence as the user moves. For example, in some cases where the employee fetches a product from the storage, the employee may walk in and out of the geo-fence of the user.

In one implementation, the payment processing system 102 may track movement of the user with respect to their device, the employees with respect to their devices, and/or generate a geo-fence based on the dynamic locations of the user, employees, and the items. The geo-fence may be created using location tracking mechanisms such as by using Bluetooth, BLE beacon technology, RSSI based frequency measurements, and the like. Further, the trackers may be configured in mobile devices, such as mobile phones, tablet computers, wearable devices, etc. The user or employee whose geo-fence is being monitored in real time or over time provides approval for such monitoring either by an explicit instruction on their devices when they enter the store or at a time of store membership. The creation of geo-fence may begin when a user enters a store or when the user enters an existing geo-fence, for example that of an employee, or by detecting actionable events, such as a handshake between a user and an employee wearing wearable devices, etc.

The payment processing system 102 may then generate a confidence score to determine the employee(s) most likely to have communicated with the user. The confidence score can be on a numerical scale or range of 1-10, a priority level as High to Low. The confidence score can be further weighted based on secondary factors such as time of the day, past interactions with the customer, the past interactions of the employee with other customers and so on.

In one implementation, the payment processing system 102 can determine one or more employees, from among a plurality of employees 106(1)-(N), that are located within the one or more portions of the geographical region 114 for a predetermined period of time. For example, if an employee is within the geo-fence for more than five minutes, it may indicate with reasonable certainty that the customer may have approached the employee or is otherwise interacting with the employee. Any less than five minutes, and the employee is taken out of consideration, in this example.

The payment processing system 102 may also send information to the user 104 regarding one or more employees, from among a plurality of employees 106(1)-(N), that are located within the one or more portions of the geographical region 114 as the user moves around the store. In particular, the information regarding the one or more employees may be sent to one or more electronic devices 108 (hereinafter "the electronic device 108") employed by the user 104 or a point of sale terminal 103 associated with a store manager 105 that checks out all items. At the time of check out, the customer may be asked to identify the employee who helped them by presenting on the interface 130 of the POS terminal 103 options. The options are determined based on the movement and interactions of the user described above. As illustrated, each of the plurality of employees 106 may be associated with a communication device 110 to engage in various transactions of items with customers and perform other processing. The payment processing system 102, the electronic device 108, the POS terminal 103, and/or the plurality of POS terminals 110 may communicate via one or more networks 112.

The store manager 105 may manage any business engaged in the offering of goods or services for acquisition by customers. In many instances, an employee may offer the goods or services for acquisition in exchange for compensation received from customers (e.g., users). Actions attributed to an employee may include actions performed by employees or other agents of the employee and, thus, no distinction is made herein between employers and their employees unless specifically discussed. In addition, a customer may include any entity that acquires goods or services from an employee, such as by purchasing, renting, leasing, borrowing, licensing, or the like. Hereinafter, goods and/or services offered by employees may be referred to as items. Thus, an employee and a customer may interact with each other to conduct a transaction in which the customer acquires one or more items from an employee, and in return, the customer provides payment to the employee or recognition in lieu of their assistance. In many instances herein, the user 104 may comprise a customer that interacts with one of the plurality of employees 106(1)-106(N) to acquire an item.

Each of the plurality of employees 106(1)-(N) may be associated with an establishment where a transaction of an item may occur. An establishment may include any premises associated with an employee, such as a geographical place of business (e.g., store), a residence, and so on. An establishment may include land, a building, a vehicle, or other property. In some instances, an establishment may be located at a fixed location that typically does not change on a day-to-day basis. In other instances, however, an establishment may change from time to time, such as in the case that the employee operates a food truck, is a street vendor, a cab driver, etc., or has an otherwise mobile business (e.g., in the case of employees who sell items at buyer's homes, places of business, and so forth). In the example of FIG. 1, the plurality of employees 106(1)-(N) is illustrated as being stationed at a single location. However, it will be understood that the description can be extended to stores with multiple locations and where employees can transfer from one location to another.

The payment processing system 102 may include one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

While FIG. 1 illustrates components and data of the payment processing system 102 as being present in a single location, these components and data may alternatively be distributed across different computing devices and/or different locations in any manner. Consequently, the functions may be implemented by one or more computing devices, with the various functionality described above distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

As illustrated, the one or more computing devices of the payment processing system 102 may include one or more processors 116, one or more communication interfaces 118, and memory 120. Each of the one or more processors 116 may include a central processing unit (CPU), a graphics processing unit (GPU), a microprocessor, a microcomputer, a microcontroller, a state machine, logic circuitries, a digital signal processor, and so on. For instance, the one or more processors 116 may be one or more hardware processors and/or logic circuits of any suitable type specifically programmed or configured to execute the algorithms and processes described herein. Each of the one or more processors 116 may be a single processing unit or a number of processing units, and may include single or multiple computing units or multiple processing cores. The one or more processors 116 can be configured to fetch and execute computer-readable instructions stored in the memory 120, which can program the one or more processors 116 to perform the functions described herein.

The one or more communication interfaces 118 may include one or more interfaces and hardware components for enabling communication with various other devices, such as over the one or more networks 112. For example, the one or more communication interfaces 118 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The memory 120 may store software functionality configured as one or more "components." The term "component" is intended to represent example divisions of the software for purposes of discussion, and is not intended to represent any type of requirement or required method, manner or organization. Accordingly, while various "components" are discussed, their functionality and/or similar functionality could be arranged differently (e.g., combined into a fewer number of components, broken into a larger number of components, etc.). Further, while certain functions and components are described herein as being implemented by software and/or firmware executable on a processor, in other embodiments, any or all of the components may be implemented in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated in FIG. 1, the memory 120 includes a geo-fence component 122 and an employee-customer interaction component 124.

The geo-fence component 122 may configure geo-fences for a geographical region to identify employees that may be of interest to the user 104. To do so, the geo-fence component 122 may determine a current geographical location of the electronic device 108 associated with the user 104. The current geographical location may be determined in a variety of manners, including receiving information from the electronic device 108 or a location-based service identifying the current geographical location, receiving cell tower information or wireless access point information from the electronic device 108 or a location-based service identifying a cell tower or wireless access point that the electronic device 108 has communicated with recently (e.g., over a previous period of time), and so on. The current geographical location may include a geo-location, a venue, etc. In some instances, the current geographical location of the electronic device 108 may be monitored over time.

In response to receiving a request from the electronic device 108 for information about employees that are located within proximity to the electronic device 108, the geo-fence component 122 may identify a geographical region around the current geographical location of the electronic device 108. The geographical region may have predefined characteristics (e.g., dimensions, shape, etc.) and may be centered on the current geographical location of the electronic device 108. For instance, the geographical region may include a circle region having a diameter of 0.5 miles and being centered on the location of the electronic device 108. This may facilitate a search for employees that are within proximity the electronic device 108. It will be understood that the employee's geo-fence may also be used to analyze the users falling within the employee's geo-fence in a manner described herein.

The geo-fence component 122 may then analyze a variety of information to identify one or more portions of the geographical region that may be of interest to the user 104 (e.g., deemed to have more than a threshold level of interest to the user 104). In other words, the geo-fence component 122 may define one or more geo-fences for portions of the geographical region. In some instances, the one or more portions of the geographical region may be associated with predetermined characteristics (e.g., include particular dimensions, shapes, etc.). As discussed below, the geo-fence component 122 may use the portions of the geographical region to identify employees that may be of interest to the user 104. In one implementation, the geo-fence component 122 determines a geographical region that overlaps with the geographical region determined for the employee and/or item being purchased by the user. For this, the devices associated with the employees and/or items are used for detection of their location. The geo-fence of the employee via the employee device is determined in a manner similar to the one explained herein with the context of the user. Example information that may be analyzed to identify one or more portions of a geographical region include:

Location information identifying locations that a user has visited. In some instances, the geo-fence component 122 may analyze the location information to identify portions of a geographical region that have been most frequented with respect to a number of visits to the portions of the geographical region, an amount of time spent in the portions of the geographical region, and so on. The geo-fence component 122 may also account for portions of the geographical region that have not been visited (e.g., avoided). To illustrate, when a user is in a store, the geo-fence component 122 may identify a pharmacy aisle within the store, since the user has frequently visited the aisle. Here, the geo-fence component 122 may exclude an alcohol area that the user has avoided (not visited and visited locations around the alcohol aisle).

Purchase history for a user indicating items that have been purchased, employees that have sold the items, amounts of purchases, times of purchases, and so on. The purchase history may be formed from transaction information that is received from POS terminals. In some instances, the geo-fence component 122 may analyze the purchase history to identify portions of a geographical region that are associated with particular categories of employees or items that may be of interest to a user. As one example, if a user frequently purchases pharmacy items, then the geo-fence component 122 may identify a portion of the store that is associated with Chinese items (e.g., includes Chinese stores or restaurants). In other instances, the geo-fence component 122 may analyze the purchase history to identify locations that have been most frequented by a user (e.g., more than a particular number of times).

Information identifying an interaction time between an employee and the user. If the user has interacted with an employee before or during a current transaction, the geo-fence component 122 may identify portions of a geographical region that surround the employees based on order of interaction time. As another example, the geo-fence component 122 may identify a portion of the store including employees who may have had a higher than threshold interaction time with users specific to an item or time of day.

Calendar information identifying appointments for a user or requests made by the user. As one example, if a user has called earlier to ask for a product to be put on hold, the geo-fence component 122 may identify the employee that received the call or put the item on hold. As another example, the geo-fence component 122 may identify a relatively large portion of the store to include the employees that were present when the customer placed the hold.

Motion information indicating a current speed or direction of an electronic device, or a recent average speed and directional trend of the electronic device. The motion information may be obtained from an accelerometer, Global Positioning System (GPS), location-based service, speedometer, and so on. As one example, if a user is walking fast (e.g., an electronic device associated with the user is fast) in a region, the geo-fence component 122 may identify portions of the region that include other devices associated with employees moving at a substantially same speed within a particular window of time due to the current speed (e.g., within the next 15 minutes). The portions of the region may be located in the direction of travel. In some instances, the portions of the region may increase in size as the speed of the user increases.

Information identifying a current navigation route of a user within the store This information may be obtained from a navigation service or otherwise. As one example, if a user is traveling from point A to point B in a region, the geo-fence component 122 may identify a portion of the region that extends along the navigation route from point A to point B (e.g., a particular distance to each side of the roads from point A to point B). Alternatively, or additionally, the geo-fence component 122 may identify portions along the navigation route at which a particular event might occur, such as identifying an exit that is estimated to be passed around lunch time.

Information identifying overlap of regions within a geographical region. The employees and the users may have overlapping regions due to the time they spend with each other as the employee assists the user. The geo-fence component 122 may identify portions of the geographical region that overlap for a duration of time more than a threshold, or if there is repetition in overlap of regions, the geo-fence component 122 identifies that employee as well since that may indicate the employee going somewhere to fetch an item for the user.

Information indicating current weather conditions for a geographical region. As one example, if it is raining in a region, the geo-fence component 122 may identify employees associated with the items that a user is more likely to buy, for example umbrellas.

Information indicating current traffic conditions for a geographical region. As one example, if current traffic conditions for a region identify an accident in a particular portion of the region, the geo-fence component 122 may identify a portion of the region that includes employees helping out with the self-checkout aisle, water bottles or snacks.

Time information indicating a current time of day, week, month, and/or year. As one example, if a user is located in a region and it's 11 AM, the geo-fence component 122 may identify a portion of the region that has been most frequented by the user around 11 AM in the past, or an employee who was stationed in the store at that time Further, the portion of the region may be a portion that has previously been visited for the current time of year (e.g., season, etc.).

Event information identifying an event occurring in a geographical region. As one example, if a user is located in a region and a concert is occurring at a particular plaza, the geo-fence component 122 may identify a portion of the region to include employees helping out with concert paraphernalia.

Social networking information identifying friends associated with a user (or preferences for the friends), content that is made available by the user (e.g., posted content, status, etc.), and so on. As one example, if social networking information indicates that the user's friends were helped by a certain employee in that store, the geo-fence component 122 may identify a portion of a geographical region to include employees who may have served the friends in the past, since the user may likely have been with his friends.

User preference information identifying one or more preferences for a user. As one example, if a user prefers a certain employee or has previously reviewed the employee, the geo-fence component 122 may identify portions of a geographical region that includes that particular employee. In some instances, user preference information may be obtained from purchase history or past receipts.

In some instances, any of the above-noted information that may be utilized by the geo-fence component 122 to identify one or more portions of a geographical region may be stored in the memory 120 as user information 126 and/or employee information.

Upon identifying one or more portions of a geographical region that may be of interest to the user 104, the geo-fence component 122 may identify employees in the one or more portions of the geographical region. For instance, if the geo-fence component 122 identifies a particular aisle of a region (e.g., geo-fence 114), then the geo-fence component 122 may identify employees that have stationed in the region to display to the user, again based on the parameters mentioned above, such as interaction time, category of time, etc. If, for example, the user may be presented employees that are associated with a particular attribute, the geo-fence component 122 may filter the employees down to those employees that are associated with the particular attribute. An attribute of an employee may include a rating (e.g., rated 4 out of 5 stars by users), a category of items offered for acquisition by the employee (e.g., perishable goods, pharmacy items, food, entertainment, etc.), a description provided by the user (e.g., age, description of looks, etc.), and so on. Some implementations may allow creation and maintenance of a wireless leash between customer's device and store location to track movement with respect to the product aisles and employee devices. Further, sensor tags can be attached to the product to track relative movement. Models based on predictive modeling can further assist in eliminating or selecting one employee over other.

Thus, the geo-fence component 122 may identify employees located within one or more portion of a geographical region by referencing the employee information 128 stored in the memory 120. The employee information 128 may include location information of employees identifying geo-locations of establishments, contact information for the employees, ratings or reviews of the employees, information identifying categories of items that are sold by the employees, pricing information, or any other information about the employees.

In one implementation, the geo-fence component 122 can generate a score corresponding to the identified employees within the geographical region. The confidence score can be used to arrange the employees in order of relevant to the user.

The user interface component 124 may cause information to be sent to the electronic device 108 regarding employees that have been identified by the geo-fence component 122. For example, the user interface component 124 may cause contact information of employees and location information for the employees to be sent so that the user 104 may find nearby employees that may be of interest. The user interface component 124 may facilitate a user interface 130 on the POS terminal 103 or the electronic device 108, and/or generate a receipt for the user indicating the employees that may have assisted the user. The employee's information includes employee name, picture, job description, or any other identifier. As illustrated in FIG. 1, the electronic device 103 displays the user interface 130 with a listing 132 of employees that satisfy a request from the user 104 at the time of transaction. In this example, the user 104 is checking out items at a store and, thus, the user interface 130 shows employees (based on a confidence scoring algorithm described in detail below) that may have potentially assisted the user during the shopping experience. Although information is displayed in this example, in other examples the information is otherwise output, such as in an audio format or in the form of a digital receipt, interactive or static, and that can be sent to the user at the time of transaction or at a later time. The user interface 200 that may be provided to notify a user of nearby employees that may be of interest. The user interface 200 may be displayed via a browser, an application, and so forth. In some instances, an application is implemented as a client application, such as a mobile application, desktop-based application, etc. In other instances, the application is implemented as part of a platform (e.g., a mobile platform), or within another context. In many instances, the user interface 200 is provided to a user provided via an electronic device, such as the electronic device 108.

The user may select or verbally confirm one of the employees presented on the user interface 130 or provide a name or additional parameters at the time of transaction or at a later time. The recommendations provided by the user may further be used to filter the recommendations. Additionally, such user provided recommendations may also be used in future payment transactions. The user interface 130 also allows the user to provide a feedback, positive or negative, or in the form of a rating, to indicate the quality of experience with the specific employee.

In cases where the user is unable to identify the employee even with the server predicted list of employees, the user may be leave a review and based on the contextual analysis of the review, the system may map it with an employee who may have been reviewed in a similar manner. In some cases, the user interface 130 displays a certain number of employees to the user, and on receiving an indication that none of those are relevant, the system 102 may generate a new set of candidates for user's selection, based on the same parameters or based on the options that user thought were not relevant.

The identity of the user submitting the review or rating through the user interface 130 may not be revealed to the employee who is being reviewed. Once the reviews are collected, the system 102 may collate the reviews and present it to the employee at the time of performance review or include such scores in computing the compensation for the employee. The compensation can be adjusted dynamically based on the dynamic confidence score of the employee.

In some instances, the payment processing system 102 may be associated with payment processing for transactions of items. In such instances, the payment processing system 102 may include transaction component, not illustrated in FIG. 1. The transaction component may function to receive information regarding a transaction from one of the POS terminals 110 and attempt to authorize a payment instrument used to conduct the transaction. The payment processing component may then send an indication of whether the payment instrument has been approved or declined back to the POS terminal 110.

Generally, when a customer and an employee enter into an electronic payment transaction, the transaction is processed by electronically transferring funds from a financial account associated with the customer to a financial account associated with the employee. As such, the payment processing component may communicate with one or more computing devices of a card payment network (e.g., MasterCard®, VISA®) over the one or more networks 112 to conduct financial transactions electronically. The payment processing component can also communicate with one or more computing devices of one or more banks over the one or more networks 112. For example, the payment processing component may communicate with an acquiring bank, an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The memory 120 (as well as all other memory discussed herein) may include volatile and nonvolatile memory and/or removable and non-removable media implemented in any type of technology for storage of information, such as computer-readable instructions, data structures, program components, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the one or more computing device of the payment processing system 102, the memory 120 may be a type of computer-readable storage media and/or may be a tangible non-transitory media to the extent that when mentioned, non-transitory computer-readable media exclude media such as energy, carrier signals, electromagnetic waves, and signals per se.

The one or more networks 112 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 112 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the plurality of POS terminals 110, the electronic device 108, and other computing devices discussed herein are able to communicate over the one or more networks 112 using wired or wireless connections, and combinations thereof.

Figure 2:
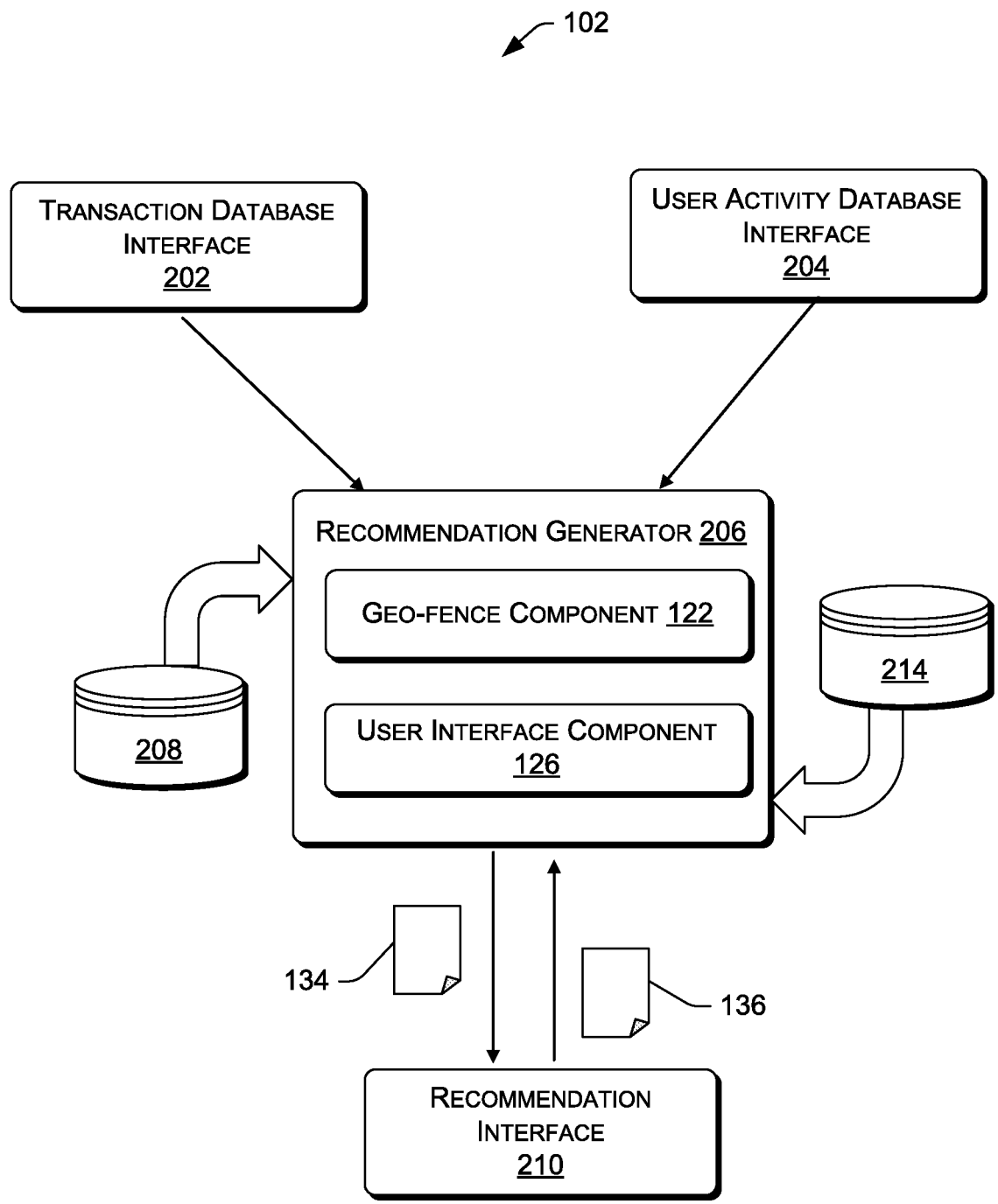
FIG. 2 illustrates an example payment processing system having the capability to generate employee related recommendations at the time of a payment transaction.

FIG. 2 is a block diagram of an example payment processing system architecture 200. The components of the payment processing system 200 can be implemented in the POS terminal or the user or employee device as well. The architecture 200 can be implemented by the payment processing system 102 of FIG. 1. Each component of the payment processing system 102 can include hardware and software (or firmware) components.

The payment processing system (PPS) 202 includes a transaction database interface 202, and a geo-fence component 122 and the user interface component 126 (within a recommendation generator 206), which are configured to interface with a transaction database (e.g., the transaction database 208) to retrieve transaction data. The transaction database interface 202 can filter out personal information (e.g., a customer name, payment technology, credit card number, credit card expiration date, or a home address), if any, in the transaction data. The transaction database interface 202 can also correspond a transaction to a user, and thereby, a receipt to the user.

The payment processing system (PPS) 202 includes a user activity database interface 204. The user activity database interface 204 is configured to interface with a user activity database 214 (e.g., the user activity database 220) to retrieve pre-purchase activity information, post-purchase activity information, and device location information. The device location information can include device locations provided by one or more customer devices over a course of time or for that transaction session, where the transaction session begins when either the user initiates communication with a first employee as reported by one or more sensors in the store, or when the user enters the store and provides explicit instructions to monitor their movement. Each device location can be associated with a timestamp. The user activity database interface 202 can filter out personal information, if any, in the user activity data.

The geo-fence component 122 is configured to determine a time and location based pattern corresponding to the user and based on that generate a geo-fence specific to the user. As mentioned before, additionally, or alternatively, the geo-fence component 122 tracks location trends and patterns for employees via their respective devices. The location based pattern corresponding to the employees can similarly be computed. The geo-fence component 122 can also determine an overlap between the geographical regions of the user and the employee for a more than threshold of time or more than a certain number of times. The number of times is based on the number of times an employee moves in and out of a user's geo-fence. Based on historical and current data related to user's and employee's location with respect to each other, the geo-fence component 122 can store the employee credentials as being relevant to whether or not the employee may have assisted the user. The geo-fence component 122 determines relevance of interaction between the employee to the user based on other data, for example other employee's user interacted with, to determine a confidence score corresponding to the user. The geo-fence component 122 can determine a location of a transaction using transaction data (which can include a merchant identifier) and an address of the identified merchant to determine interaction history between the employee and the user or other users at that location or other merchant locations. The address of the merchant can be stored in a merchant registry 214.

The PPS 102 is configured to receive, from a recommendation interface 210, a recommendation request 136. The recommendation interface 210 is a component of the PPS 102 configured to receive a request from a merchant and present a recommendation in response to the request. The recommendation interface 210 can include a web server serving content to a user or employee device, a web browser for displaying content proved by a web server, or both. The request can originate in response to a transaction being performed at the POS terminal between a merchant and a user. The recommendation request 136 may be sent at the time after the transaction is processed but before the receipt is generated. In some implementations, the recommendation request 136 may be sent at the time after the transaction is processed and after the receipt is generated, say at a later time an updated receipt with an option "Who helped you with this purchase" option may be sent. In yet other implementations, the recommendation request 136 may be sent at a time before the transaction is processed so that the user's feedback can be used to impact the current transaction. For example, based on the review, the PPS 102 may assign coupons or other kind of rewards to the user, and also to the employees. The incentives rendered to the employee may be weighted based on the kind of review, for example how helpful the employee was to the customer.

The request 136 can include various parameters. The request 136 can specify a time period (e.g., weekdays, 6 pm through 8 pm). The request 136 can include an identifier identifying an item (e.g., hot coffee) or a service, or identifying a type of items (e.g., coffee, including hot coffee and iced coffee) or services. The request 136 can specify a geographic area (e.g., a city name or postal code area). The request 136 can specify a customer type (e.g., regular customers or new customers). If the request 136 does not specify one or more parameters (e.g., the time period, type of items, geographic area, or customer type), the geo-fence component 122 can determine the unspecified parameter based on known information. For example, if the request 136 does not specify an item type, the geo-fence component 122 can perform analysis based on all items (e.g., hot coffee, iced coffee, cookies, and juices) sold by the merchant requesting recommendations, or the user swiping the payment object.

The geo-fence component 122 can determine a confidence score of the interactions between the user and the employees within the store with whom the user interacted in a specified time period and in the specified geographic area based on the type of items and customer type. The geo-fence component 122 can retrieve a map information from a map data-structure within database 214 to determine route of the user within the store, the geo-fence associated with respect to the user and any information pertaining to geo-fences of employees, items and aisles overlapping with the geo-fence of the user. As mentioned before, the geo-fence component 122 computes a confidence score for each employee within the user's geo-fence as a factor of one of the interaction time between user and the employee, the item being purchased by the user, the historical data of the user, the historical data of the employee or merchant, and the like. In one implementation, the confidence score is computed indicates likelihood or probability of the employee being relevant to the user, for example in terms of whether or not the employee may have assisted the user during the shopping visit. In common use, data is interpreted on its face value. However, from a statistical point of view, the results of a measurement may be interpreted or compared in context of the confidence that measurement accurately represents the underlying characteristic that is being measured. Uncertainties in measurements will arise from variability in sampling, the measurement method, operators and so forth. The statistical tool for expressing this uncertainty is called a confidence interval depending upon the exact situation in which the data is being generated.

Confidence interval refers to the region containing the limits or band of a parameter with an associated confidence level that the bounds are large enough to contain the true parameter value. The bands can be single-sided to describe an upper or lower limit or double sided to describe both upper and lower limits. The region gives a range of values, bounded below by a lower confidence limit and/or from above by an upper confidence limit, such that one can be confident (at a pre-specified level such as 95% or 99%) that the true population parameter value is included within the confidence interval. Confidence intervals can be formed for any of the parameters used to describe the characteristic of interest. In the end, confidence intervals are used to estimate the population parameters from the sample statistics and allow a probabilistic quantification of the strength of the best estimate.

A prediction interval for an individual observation is an interval that will, with a specified degree of confidence, contain a randomly selected observation from a population.

The inclusion of the confidence interval at a given probability allows the data to be interpreted in light of the situation. The interpreter has a range of values bounded by an upper and/or lower limit that is formed for any of the parameters used to describe the characteristic of interest. Meanwhile and at the same time, the risk associated with and reliability of the data is fully exposed allowing the interpreter access to all the information in the original measurement. This full disclosure of the data can then be used in subsequent decisions and interpretations for which the measurement data has bearing.

In one implementation, the geo-fence component 122 calculates confidence scores such that the scores may indicate a likelihood that an employee is found within a geo-fence of the user or within an acceptable range. In some examples, geo-fence component 122 may calculate a facial detection confidence score, a location detection confidence score, and a geometric consistency score. The face detection confidence score may indicate a value that a face of an employee as indicated by the user has been detected. The location confidence score may indicate a confidence that the coexistence of a user and an employee in a specific location has been detected. In some examples, the coexistence can be in terms of an exact geolocation, a geo-fence, and the like. The geometric consistency score may calculate a confidence value based on measurements of the distances between the user and the employee with respect to other employees. The geometric consistency score may be based on a likelihood that the distances between the closest employees indicate greater relevance. Each of the face detection confidence score, location confidence score, and the geometric consistency scores may indicate whether or not an employee's identifier is of high or low quality. The geometric consistency and location detection scores are further described below with respect to FIG. 4.

Accordingly, the user interface component 216 can then generate textual or graphic representation of the employees relevant to the user in order of the confidence scores, or textual or graphic representation of a recommendation 134 of a specific employee most likely to have helped the user based on the confidence score. The user interface component 216 can overlay the textual or graphic representation 134 and recommendation of employee 134 on the virtual map of a user's route within the store. The user interface component 216 can provide the overlaid virtual map on a payment receipt for presenting to a merchant or user as response to the request 136.

Figure 3:
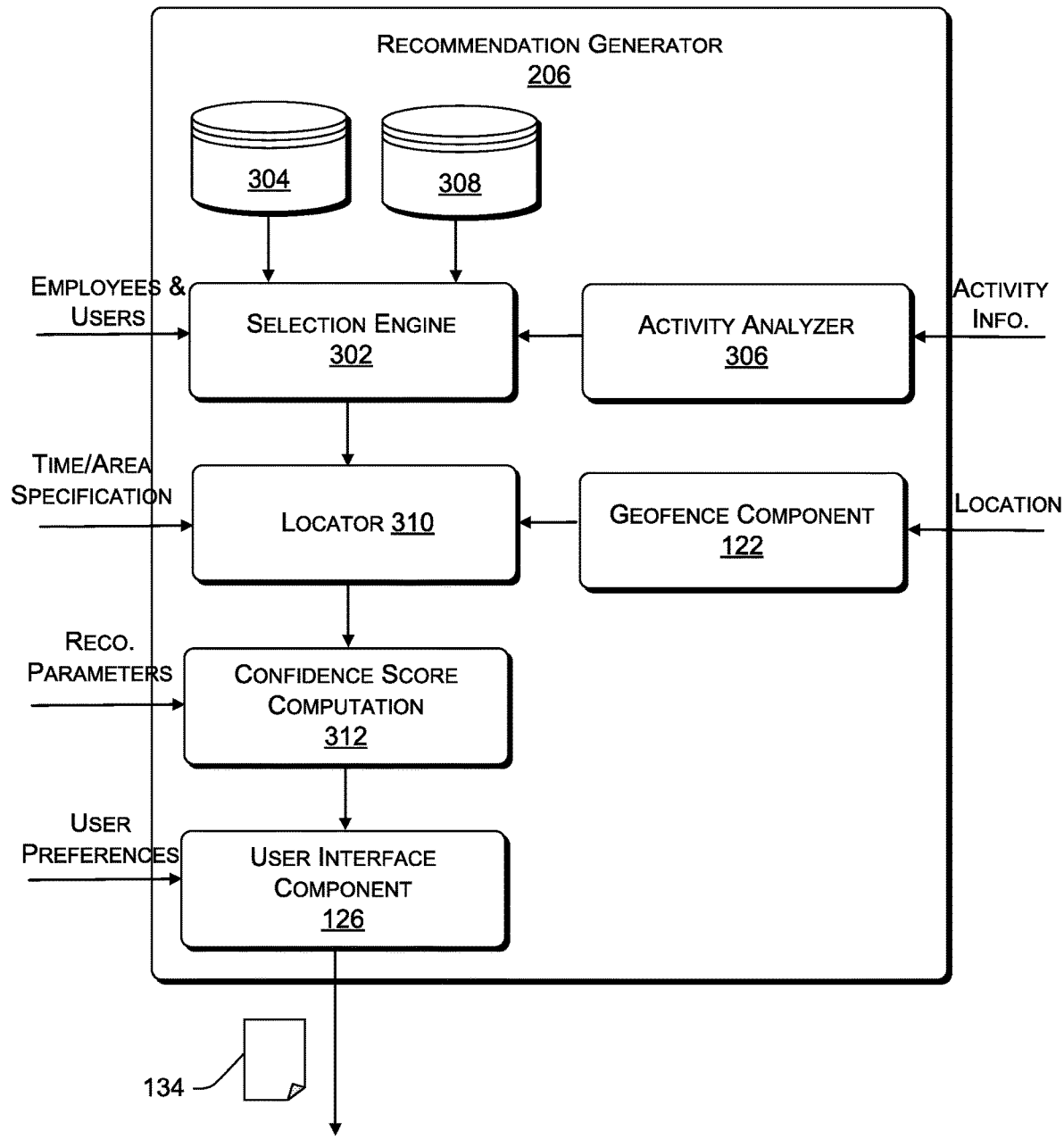
FIG. 3 illustrates an example recommendation generator within the payment processing system configured to generate a list of employees likely to have assisted the customer, as a function of confidence score.

FIG. 3 is a block diagram of an example recommendation generator 206 within the PPS 102. Each component of the recommendation generator 206 can include hardware and software (or firmware) components.

The recommendation generator 206 can include a customer and employee profile database 304, similar to user information 126 and employee information 128. The profile database 304 is a component of the recommendation generator 206 configured to store various pre-defined or user-generated profiles defining customers, and profile obtained based on past transaction history or current interaction with the store and payment system. Each profile defines a type of customers and can be associated with a label, the profile may also include device profile associated with the customer's device. For example, the customer profile database 304 can store a profile corresponding to the top five percent of anonymous customers each of whom buys the most number of units of an item. The top five percent of customers can be labeled as "top customers" in the customer profile database 304. The profile database 304 also includes profiles of employees, such as names, interaction history with other users, subject of expertise (for example, historical trends may indicate that a certain employee understands pharmacy or layout of the toys aisle better than the layout of household items), the aisle or area of the store where the employee is usually stationed or assigned, and the like. Each profile defines a type of employees and can be associated with a label, the profile may also include device profile associated with the employee's device.

The recommendation generator 206 also includes a rule database 308 to map rules to the specific employee, user or employee-user combination to map an employee with a user. The rules may also include limits of what or what does not qualify as acceptable interaction time, or who to exclude from a user's list of relevant employees.

The recommendation generator 206 can include a selection engine 302. The selection engine 302 can be configured to select, from multiple employees, one or more employees that match a given profile or were within the geo-fence of the user while the user shopped, or employees that fall within the user's geo-fence. The selection engine 302 can receive, as parameters of a merchant request, a profile selection identifying one or more profiles from the profile database 304 and one or more item identifiers identifying items or services. Using purchase information in the transaction data, the selection engine 302 can select the one or more customers and the employees who may have assisted the customers. In one implementation, the customer is selected based on whether or not they are being currently served at the checkout counter.

The recommendation generator 206 can include an activity analyzer 306. The customer activity analyzer 306 is a component of the demand analyzer 206 configured to receive, as part of the transaction data, pre-purchase activity information and post-purchase activity information of anonymous customers. Based on the pre-purchase activity information, the customer activity analyzer 306 can determine one or more terms an anonymous customer uses to search and find an item, and one or more items the anonymous customer viewed but did not purchase. Based on the post-purchase activity information, the customer activity analyzer 306 can determine one or more terms the anonymous customer uses to describe an item, and whether the anonymous customer likes or dislikes the item. The customer activity analyzer 306 can provide the terms to search or describe the item and the one or more items to the customer selection engine 302. The activity database 306 can also indicate the location route, pattern, a history of users requesting assistance with an item or employees providing assistance with an item, current and past trends related to user's movement within the store, and so on. Additionally, the activity database 306 also provides an employees' activity history, not just at a specific store but any other stores the employee may have served.

The customer selection engine 302 can adjust selections of stereotypical employees using the terms to search or describe the item and the one or more items as well as interaction between the customer and the employee. For example, the selection engine 302 can associate, based on an item being bought by the customer, an employee responsible for the aisle where that item is stored, and tag that employee as a "relevant employee" upon determining that the customer needed assistance for that item. In addition, the selection engine 302 can associate search terms or review terms provided by the customer to further search the employee database to provide the suggestions as part of the employee recommendation.

The recommendation generator 206 can include a location interface 310. The geo-fence component 122 is a component of the demand analyzer 206 configured to receive location information and merchant registry data that include addresses of one or more employees relevant to the user. The location interface 310 can translate each address into geographic coordinates (e.g., latitude, longitude, and optionally, altitude coordinates), and provide the geographic coordinates and an associated timestamp of purchase to a locator 310. In addition, the geo-fence component 122 can provide device locations and associated timestamps to the locator 310.

The geo-fence component 122 is a component of the demand analyzer 206 configured to determine a location of a set of employees (provided by the selection engine 302). The geo-fence component 122 can determine the location based on the device locations received from location interface 310 and an anonymous link (e.g., an encrypted device identifier) linking a transaction and a geographic location. The geo-fence component 122 can determine the location using parameters provided in the request, including time (for matching the timestamps associated with the geographic locations) and geographic area (for filtering out locations considered irrelevant by a merchant, e.g., a location out of a city where the merchant serves).

The geo-fence component 122 can determine a movement pattern and repetition pattern of each customer, employee, items, etc. For example, the customer locator 810 can determine that a customer buys an item between noon and 1 pm, and repeats the purchase every day during weekdays and needs assistance with that item whenever they purchase it. The geo-fence component 122 can provide the selected customers and associated locations, movement pattern, and repetition pattern to a recommendation generator 206, along with identities of employees who may assisted them in the past.

The recommendation generator 206 may be configured to present the selected employees or customers and associated locations, movement pattern, and repetition pattern provided by the customer locator 310 for display according to one or more recommendation parameters sent to the confidence score computation unit 312. Based on the recommendation parameters, the confidence score computation unit 312 can generate a confidence score rating employees with whom the users interact. The user interface component 126 then presents various charts, graphs, or text content for display overlaying on a virtual map or stand-alone. The recommendation generator 206 can provide the representations, as well as suggestions on how to receive customer feedback as recommendations 134 to a customer.

Figure 4:
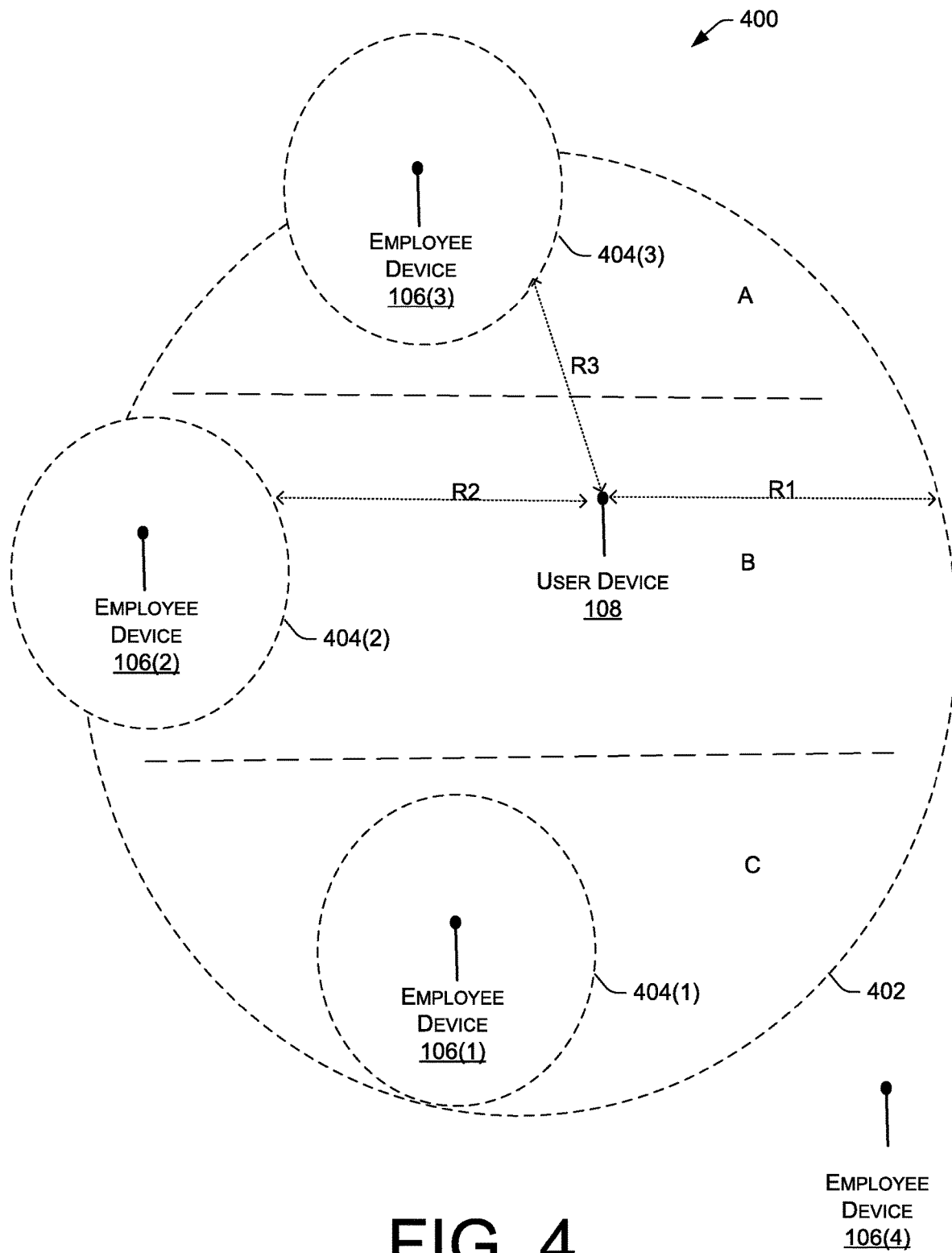
FIG. 4 is an example scenario that illustrates a mobile device facilitating generation of a geo-fence that also includes devices associated with an employee proximate to the user.

FIG. 4 is an example map 400 that illustrates a mobile device 108 facilitating generation of a geo-fence 402, also referred to as a triggering geo-fence, surrounding the mobile device 108 or in proximity to the user 104. The mobile device 108 can be a device associated with a customer entering a store to purchase one or more items or even an employee employed at a store. As shown in an example set-up, the store may have multiple aisles with multiple items within each aisle. For example, the store may have at least aisle A-F, even though A-C are shown. For each aisle or set of aisles, the store manager may assign a specific employee to answer any questions a customer may have. Optionally, the employees may be "floating" and may move from one aisle to another to assist the customer. Additionally, store items may include information stored in an inventory management system associated with the merchant that identifies which aisle an item (e.g., A-C) should be located. Along with the geo-location data, item information and store layout data may be used by the present system in computing the confidence score and likelihood that a particular employee assisted the customer.

When the customer enters the store, the customer may be associated with a geo-fence determined by their devices. As the customer moves towards where the employees are stationed, some employees may fall within the moving geo-fence established by the customer's device, while some employees may be excluded from the customer's geo-fence. With a remaining geo-fence (e.g., the remaining geo-fence as described above), the mobile device 108 generates the geo-fence around the mobile device's current location and sets a relatively large radius for the geo-fence, relative to the size of the geo-fences used to detect presence near the locations where the item is, for example aisles A-C. The large radius encloses up to, but does not include, the closest location that does not have a small geo-fence. That is, if N is the maximum number of concurrent geo-fences, then the perimeter of the "large" geo-fences is set to include the N−1 closest locations, but not include the Nth closest location. For example, as illustrated in FIG. 4, the mobile device 108 generated small geo-fences around locations 106(1), 106(2), and 106(3), but did not generate a geo-fence around location 106(4). The "large" geo-fence is established to include locations 106(1), 106(2), and 106(3) but does not include location 106(4). In some implementations, the radius of the large geo-fence is the distance between the mobile device's current location and a point on an outer bound circumference. The outer bound circumference can be a perimeter of the geo-fence that would be generated around the closest location that does not have a small geo-fence (e.g., location 106(4)). In another implementation, the employee devices 106(2), 106(1), and 106(3) are included based on their relative distance from the user device. For example, if R1 and R2 is less than R3, the employee devices are included. In yet another implementation, the employee devices are considered to be relevant if the geo-fence of the user device overlaps with the geo-fence established by an employee's device, and/or such overlap occurs for more than a certain interaction time between the user and the employee. The interaction time, in terms of geo-fence, can be computed as a measure of how long the geo-fence of the user and the customer stays substantially the same.

Figure 5:
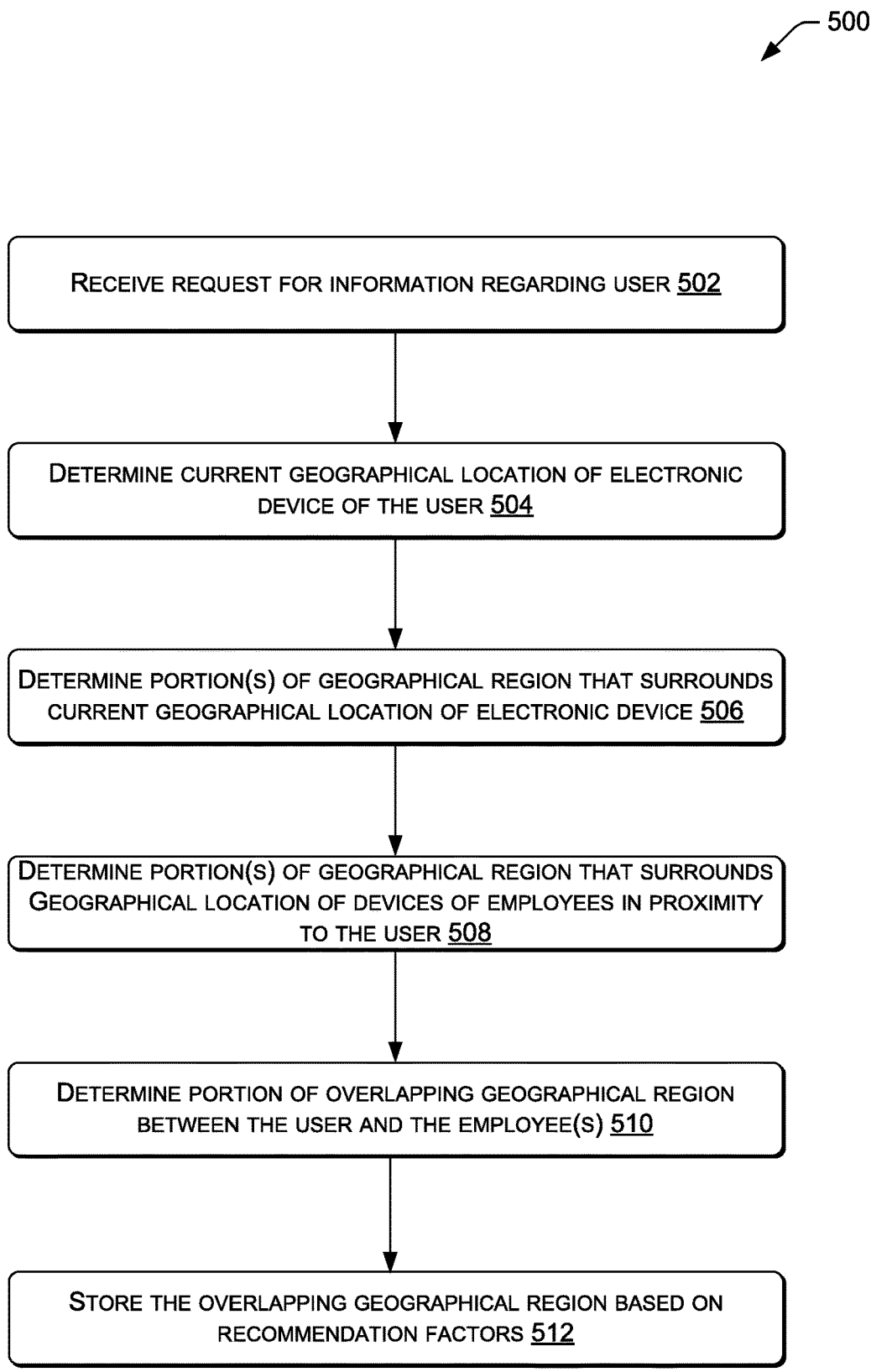
FIGS. 5-7 illustrates an example process to identify a portion(s) of a geographical region that is deemed to have more than a threshold level of interest to a user and to cause display of a map of the portion(s) of the geographical region.
Figure 6:
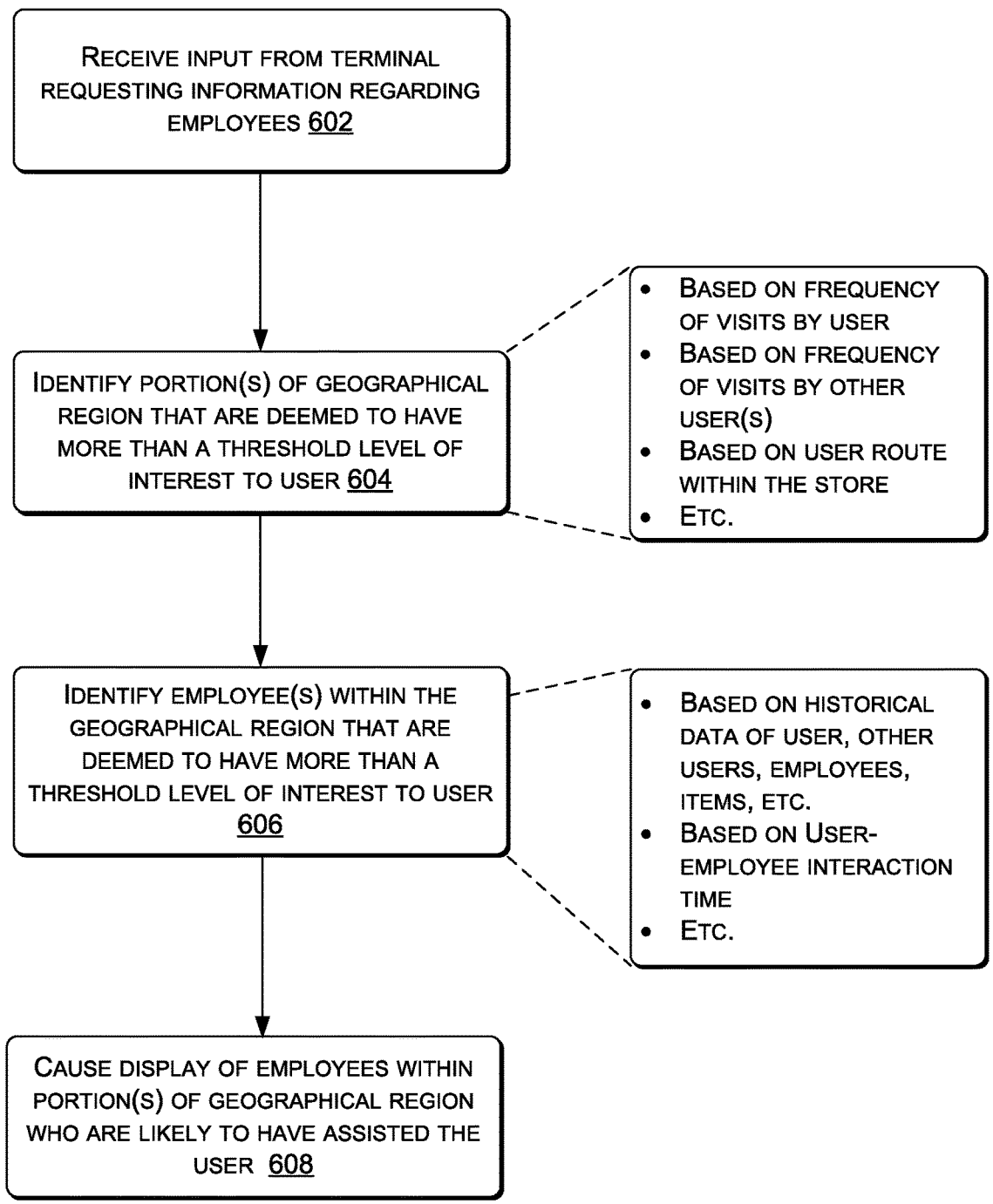
Figure 7:
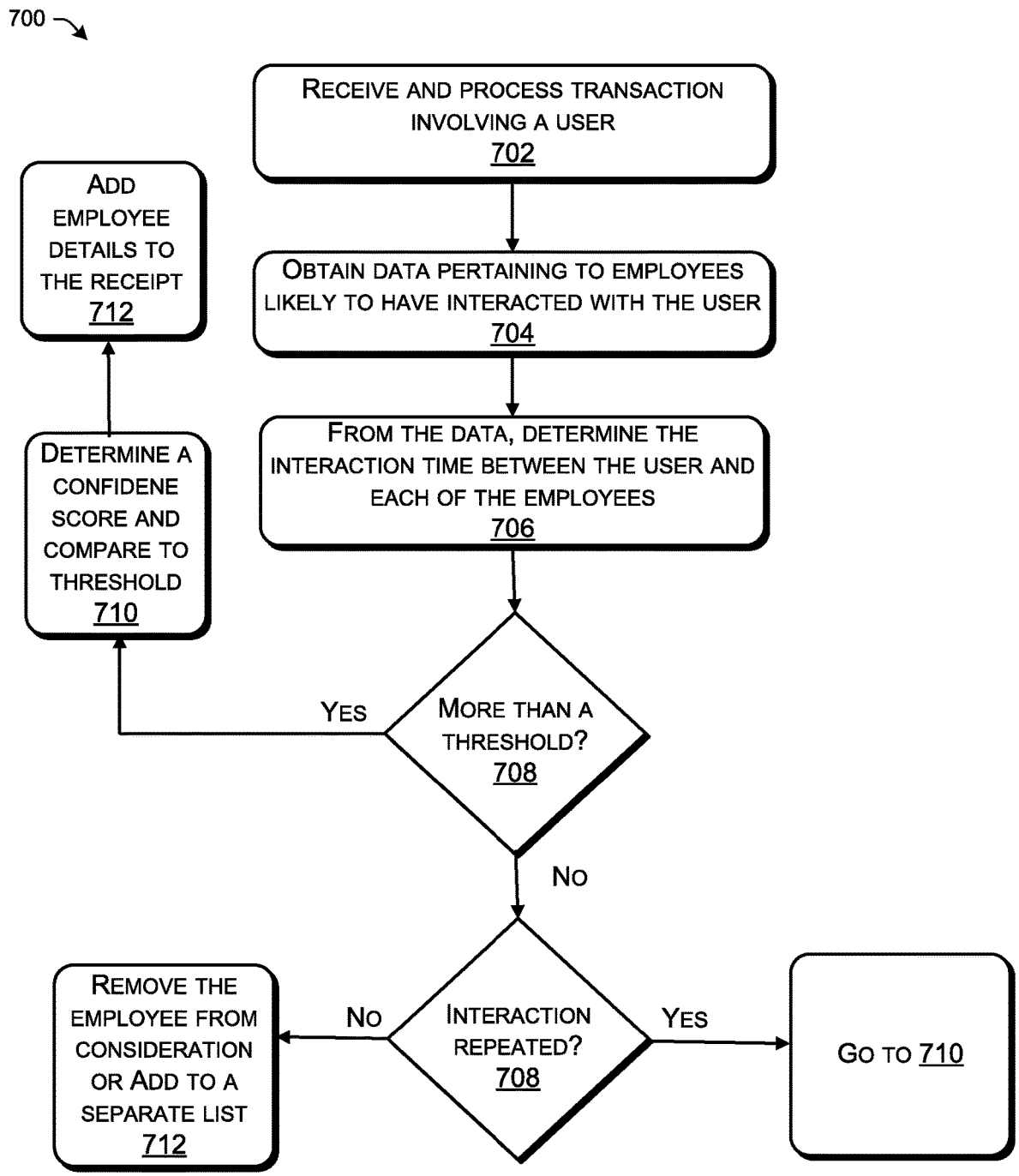

FIGS. 5, 6 and 7 illustrate example processes 500, 600, and 700 for employing the techniques described herein. For ease of illustration the processes 500, 600, and 700 are described as being performed in the architecture 100 of FIG. 1. For example, one or more of the individual operations of the processes 500, 600 and/or 700 may be performed by the payment processing system 102, the electronic device 108, and/or one of the POS terminals 110. However, the processes 300 and 400 may be performed in other architectures. Moreover, the architecture 100 may be used to perform other processes.

The processes 500, 600, and 700 (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 5 illustrates the example process 500 to determine a portion(s) of a geographical region that surrounds a current location of an electronic device and to determine employees within the portion(s) so as to determine the likelihood of an employee having assisted the customer or otherwise impacted the customer's retail experience.

At 502, the payment processing system 102 may receive a request from the electronic device 108 to receive information regarding employees likely to have assisted the customer. The request may request information for employees that are associated with a particular attribute, such as a particular rating, a particular category of items, a particular price range, and so on. The request may include user information, such as past and current transaction history, feedback history, and the like. In one implementation, this step may be performed as soon as the user enters an area designated by the store as shopping area. The user may be asked to confirm whether they permit tracking of their movement via the mobile device, as they shop. In another implementation, this step may be executed at the time of payment transaction.

At 504, the payment processing system 102 may determine a current geographical location of the electronic device 108. In some instances, this may include communicating with the electronic device 108 and/or a location-based service to receive location information. In one implementation, this step may be a combination of locations of the user device tracked over time.

At 506, the payment processing system 102 may determine, from a geographical region surrounding the current geographical location, one or more portions of the geographical region. The determination at 506 may be based on a location in the geographical region that is most frequented by a user, purchase history for the user, a mode of transportation that is currently being used by the user, an appointment for the user with an employee, a hold request placed by a customer, a current speed or direction of movement, a current navigation route of the user, a transportation route in the geographical region, current weather conditions for the geographical region, current traffic conditions for the geographical region, a current time of day or year, an event occurring in the geographical region, and so on. In some instances, many pieces of information are used with each piece of information being weighted with a degree of importance. The one or more portions of the geographical region (i) may include offer for acquisition items that are associated with a same category as items identified in purchase history, (ii) may be within a predetermined proximity to a transportation or navigation route, (iii) may be within a predetermined proximity to a location of an appointment, (iv) may be within a distance to the current geographical location a user (where the distance is based on a current speed), and so on.

At 508, the payment processing system 102 may identifying one or more employees located within the one or more portions of the geographical region. In some instances, the one or more employees may also have an attribute specified in the request received at 502 or may overlap with the portions of geographical regions identified in step 506.

At 510, the payment processing system 102 may determine if any overlap occurs between the geo-fence of the customer and the geo-fence of the employee. The overlapped region indicates more than a threshold time of interaction between the customer and the employee. The overlapping regions and other attributes related to the overlap, such as interaction time, area of overlap, the item being purchased by the customer, etc., are also stored for further analysis and computation of the confidence score.

FIG. 6 illustrates the example process 600 to identify a portion(s) of a geographical region that is deemed to have more than a threshold level of interest to a user and to cause display of a map of the portion(s) of the geographical region.

At 602, the electronic device 108 may receive input from the user 104 requesting information regarding employees. The input may include touch input, text input, gesture input, speech input, and so on. In another implementation, the merchant may initiate such request at the time of transaction to determine the identity of an employee who assisted the customer.

At 604, the electronic device 108 may identify, from a geographical region surrounding a current geographical location of the user 104, one or more portions of the geographical region that are deemed to have more than a threshold level of interest to the user 104. The level of interest may based on a frequency of visits by the user 104, or another user having a threshold level of similarity to the user 104 (e.g., due to user preference, purchase history, demographics, etc.). In one example, the one or more portions of the geographical region include a portion of the geographical region that has been visited more than a threshold number of times. The identification at 604 may include receiving information from the payment processing system 102 regarding the one or more portions of the geographical region. Alternatively, the identification at 604 may include processing at the electronic device 108 to determine the one or more portions of the geographical region.

At 606, the electronic device 108 may identify, employees within the one or more portions of the geographical region that are deemed to have more than a threshold level of interest to the user 104. The selection of employees may be based on an overlap of geo-fences, historical data showing interaction between the same user and employee, interaction time, etc. At 608, the electronic device 108 may cause display of a map of the one or more portions of the geographical region. The map may include information that identifies identity of an employee that is located in the one or more portions of the geographical region. The map may also include information identifying a level of interest for each of the one or more portions of the geographical region. The level of interest, for example in terms of confidence score, may be based on a number of visits by the user or other users (e.g., the level of interest increases as the number of visits increases). Further, in some instances the map includes information designating a boundary for each of the one or more portions of the geographical region (e.g., the map displays the geo-fence that is used for identifying employees). This may include sending information to the electronic device 108 so that the electronic device 108 may display, render, or otherwise output the information in a displayable, audible, or other format.

FIG. 7 illustrates the example process 700 to determine the confidence, relevance or likelihood of an employee having assisted the customer or otherwise impacted the customer's retail experience, according to another embodiment of the present subject matter.

At 702, the payment processing system 102 may receive a request from the electronic device 108 to receive information regarding employees likely to have assisted the customer. The request may request information for employees that are associated with a particular attribute, such as a particular rating, a particular category of items, a particular price range, and so on. The request may include user information, such as past and current transaction history, feedback history, and the like. In one implementation, this step may be performed as soon as the user enters an area designated by the store as shopping area. The user may be asked to confirm whether they permit tracking of their movement via the mobile device, as they shop. In another implementation, this step may be executed at the time of payment transaction.

At 704, the payment processing system 102 may determine one or more employees that were likely to have interacted with the customer. The likelihood may be determined as long as the customer's geo-fence substantially included or overlapped the employee's geo-fence. In one implementation, the system 102 determines a current geographical location of the electronic device 108. In some instances, this may include communicating with the electronic device 108 and/or a location-based service to receive location information. In one implementation, this step may be a combination of locations of the user device tracked over time. The payment processing system 102 may determine, from a geographical region surrounding the current geographical location, one or more portions of the geographical region. The determination at 506 may be based on a location in the geographical region that is most frequented by a user, purchase history for the user, a mode of transportation that is currently being used by the user, an appointment for the user with an employee, a hold request placed by a customer, a current speed or direction of movement, a current navigation route of the user, a transportation route in the geographical region, current weather conditions for the geographical region, current traffic conditions for the geographical region, a current time of day or year, an event occurring in the geographical region, and so on. In some instances, a plurality of pieces of information are used with each piece of information being weighted with a degree of importance. The one or more portions of the geographical region (i) may include offer for acquisition items that are associated with a same category as items identified in purchase history, (ii) may be within a predetermined proximity to a transportation or navigation route, (iii) may be within a predetermined proximity to a location of an appointment, (iv) may be within a distance to the current geographical location a user (where the distance is based on a current speed), and so on.

At 706, the system 102 may also determine the interaction time between the employee and the customer.

At 708, the payment processing system 102 determines if the interaction time is more than a threshold. If yes, the employee is added to a list of relevant employees to the user at step 712 after a confidence score is computed at step 710; however, if not, the system 102 further determines at step 708 whether the interaction is repeated. If yes, the employee is added to the list since the employee may be going in and out of the user's geo-fence to fetch the product from a different aisle or warehouse. If the answer to the determination of step 708 is a no, the employee is removed from the consideration or added to a separate list to indicate negative customer experience.

At step 710, the recommendation generator computes a confidence score for each of the employees within the determine overlapping region. If the score is greater than a threshold amount, then that employee is added to the receipt. In one example, a plurality of employees may be relevant to the user due to, say, the employees falling within a user's geo-fence. To that end, the recommendation generator computes a confidence score for each of the matches that indicates an absolute or relative quality of each of the employees, the quality of the employees, say in terms of interaction time, or otherwise a level of confidence that the generator provided a match is correct (the intended concept the user was entering or trying to interact with the employee, for example based on facial recognition). This determination at 712 may also result or involve a ranking of the matches (which may be reflected in the order of the matches displayed in the drop-down menu).

One or more of numerous factors may be used to determine a confidence score, quality, or ranking of an employee to a user. By way of example, such factors may again include, as just described, the past data involving the employee, the user or the item, the number of users connected to the employee in the past or current time window, and the like. Information characterizing the strength of the connections associated with the employees may also be used to weight their relevancy in determining the most relevant matching employee.

By way of example, based on the confidence scores, which may have been determined at 712, the recommendation generator may determine whether there is a determined level of certainty or confidence (a confidence score) for each match before the match is displayed to the user in the form of a drop-down menu for selection or auto-populated in the form box. That is, in particular embodiments, even though one or more matches have been identified from the employee database, their respective certainties (in being the actual concept the user was intending to declare) as demonstrated by their determined confidence scores may be below a first predetermined threshold, and hence, none of the matches may be displayed to the user and be auto-populated by the recommendation generator. That is, rather than display and provide the user with the match or matches having confidence scores below the threshold, the generator may allow the user to provide additional information and then transmit the request to compute confidence scores to further narrow the scope of search. The recommendation generator may determine the best match corresponding to the user's declaration and proceed to determining information about the existing node to the best matching node, resulting in generator of confidence score pertinent to data collected from the field and user declaration.

In alternate embodiments, determining a confidence score of each match may be performed as a part of the searching step 704. In such embodiments, the determination of whether a match or matches have been found may be based on comparing respective confidence scores determined for the prospective matches with a second predetermined threshold below the first predetermined threshold described above. That is, the second predetermined threshold may be used when determining if a match is found while the first predetermined threshold may be used when determining if the match should be auto populated for display to the user.

Figure 8:
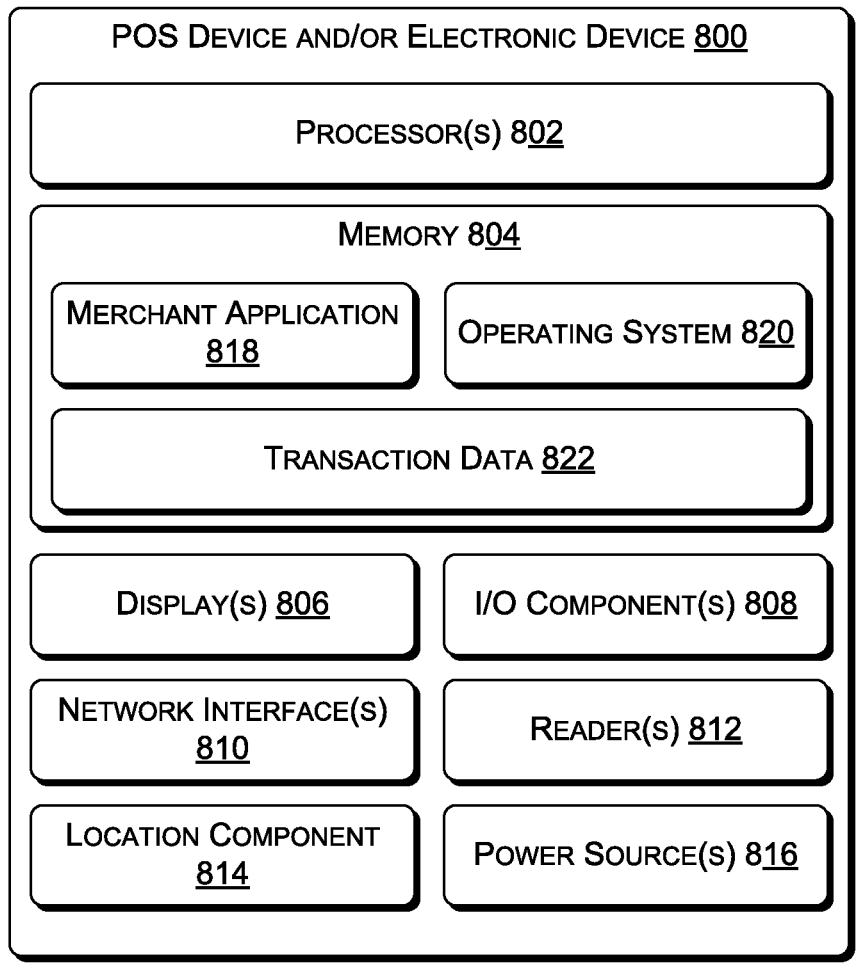
FIG. 8 illustrates select example components of an example POS terminal and/or electronic device according to some implementations.

FIG. 8 illustrates select example components of an example POS terminal and/or electronic device (e.g., one of the POS terminals 110 or the electronic device 108) according to some implementations. The device 800 may be any suitable type of computing device, e.g., mobile, semi-mobile, semi-stationary, or stationary. Some examples of the device 800 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the device 800 includes one or more processors 802, memory 804, one or more displays 806, one or more input/output (I/O) components 808, one or more network interfaces 810, one or more payment instrument readers 812, at least one location component 514, and one or more power sources 816. Each of the one or more processors 802 may include a central processing unit (CPU), a graphics processing unit (GPU), a microprocessor, a microcomputer, a microcontroller, a state machine, logic circuitries, a digital signal processor, and so on. For instance, the one or more processors 802 may be one or more hardware processors and/or logic circuits of any suitable type specifically programmed or configured to execute the algorithms and processes described herein. Each of the one or more processors 802 may be a single processing unit or a number of processing units, and may include single or multiple computing units or multiple processing cores. The one or more processors 802 can be configured to fetch and execute computer-readable instructions stored in the memory 804, which can program the one or more processors 802 to perform the functions described herein.

The memory 804 (as well as all other memory discussed herein) may include volatile and nonvolatile memory and/or removable and non-removable media implemented in any type of technology for storage of information, such as computer-readable instructions, data structures, program components, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the device 800, the memory 804 may be a type of computer-readable storage media and/or may be a tangible non-transitory media to the extent that when mentioned, non-transitory computer-readable media exclude media such as energy, carrier signals, electromagnetic waves, and signals per se.

The memory 804 may be used to store and maintain any number of functional components that are executable by the one or more processors 802. In some implementations, these functional components comprise instructions or programs that are executable by the one or more processors 802 and that, when executed, implement operational logic for performing the actions and services attributed above to the device 800. Functional components of the device 800 stored in the memory 804 may include a POS application 818. The POS application 818 may present an interface on the device 800 to enable the employee to conduct transactions, receive payments, and so forth, as well as communicating with the payment processing system 102 for processing payments and sending transaction information. Further, the POS application 818 may present an interface to enable the employee to manage the employee's account, and the like. Additional functional components may include an operating system 820 for controlling and managing various functions of the device 800 and for enabling basic user interactions with the device 800. The memory 804 may also store transaction data 822 that is received based on the employee associated with the device 800 engaging in various transactions with customers.

The POS application 818 may also allow the user to (a) allow the system 102 to access the location of the user for determining employees that interact with the year; (b) generate and map the geo-fence of the user with the employees in a store; and (c) generate and display a list of employees predicted to have interacted with the customer during the customer's shopping experience.

In addition, the memory 804 may also store data, data structures and the like, that are used by the functional components. For example, this data may include item information that includes information about the items offered by the employee, which may include images of the items, descriptions of the items, prices of the items, and so forth. Depending on the type of the device 800, the memory 804 may also optionally include other functional components and data, which may include programs, drivers, etc., and the data used or generated by the functional components. Further, the device 800 may include many other logical, programmatic and physical components, of which those described are merely examples that are related to the discussion herein.

The network interface(s) 810 may include one or more interfaces and hardware components for enabling communication with various other devices over the network or directly. For example, the network interface(s) 810 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 8 further illustrates that the device 800 may include the one or more displays 806 mentioned above. Depending on the type of computing device used as the device 800, the one or more displays 806 may employ any suitable display technology. For example, the one or more displays 806 may be a liquid crystal display, a plasma display, a light emitting diode display, an OLED (organic light-emitting diode) display, an electronic paper display, or any other suitable type of display able to present digital content thereon. In some examples, the one or more displays 806 may have a touch sensor associated with the one or more displays 806 to provide a touchscreen display configured to receive touch inputs for enabling interaction with a graphic interface presented on the one or more displays 806. Accordingly, implementations herein are not limited to any particular display technology. Alternatively, in some examples, the device 800 may not include the one or more displays 806, and information may be present by other means, such as aurally.

The one or more I/O components 808, meanwhile, may include speakers, a microphone, a camera, and various user controls (e.g., buttons, a joystick, a keyboard, a keypad, etc.), a haptic output device, and so forth.

In addition, the device 800 may include or may be connectable to the one or more payment instrument readers 812 (e.g., card reader). In some examples, the one or more payment instrument readers 812 may plug in to a port in the employee device, such as a microphone/headphone port, a data port, or other suitable port. In other instances, the one or more payment instrument readers 812 is integral with the entire device 800. The one or more payment instrument readers 812 may include a read head for reading a magnetic strip of a payment card, and further may include encryption technology for encrypting the information read from the magnetic strip. Alternatively, numerous other types of card readers may be employed with the device 800 herein, depending on the type and configuration of a particular device 800.

The location component 814 may include a GPS device able to indicate location information, or the location component 814 may comprise another other location-based sensor. The device 800 may also include one or more additional sensors (not shown), such as an accelerometer, gyroscope, compass, proximity sensor, and the like. Additionally, the device 800 may include various other components that are not shown, examples of which include removable storage, a power control unit, and so forth.

Figure 9A:
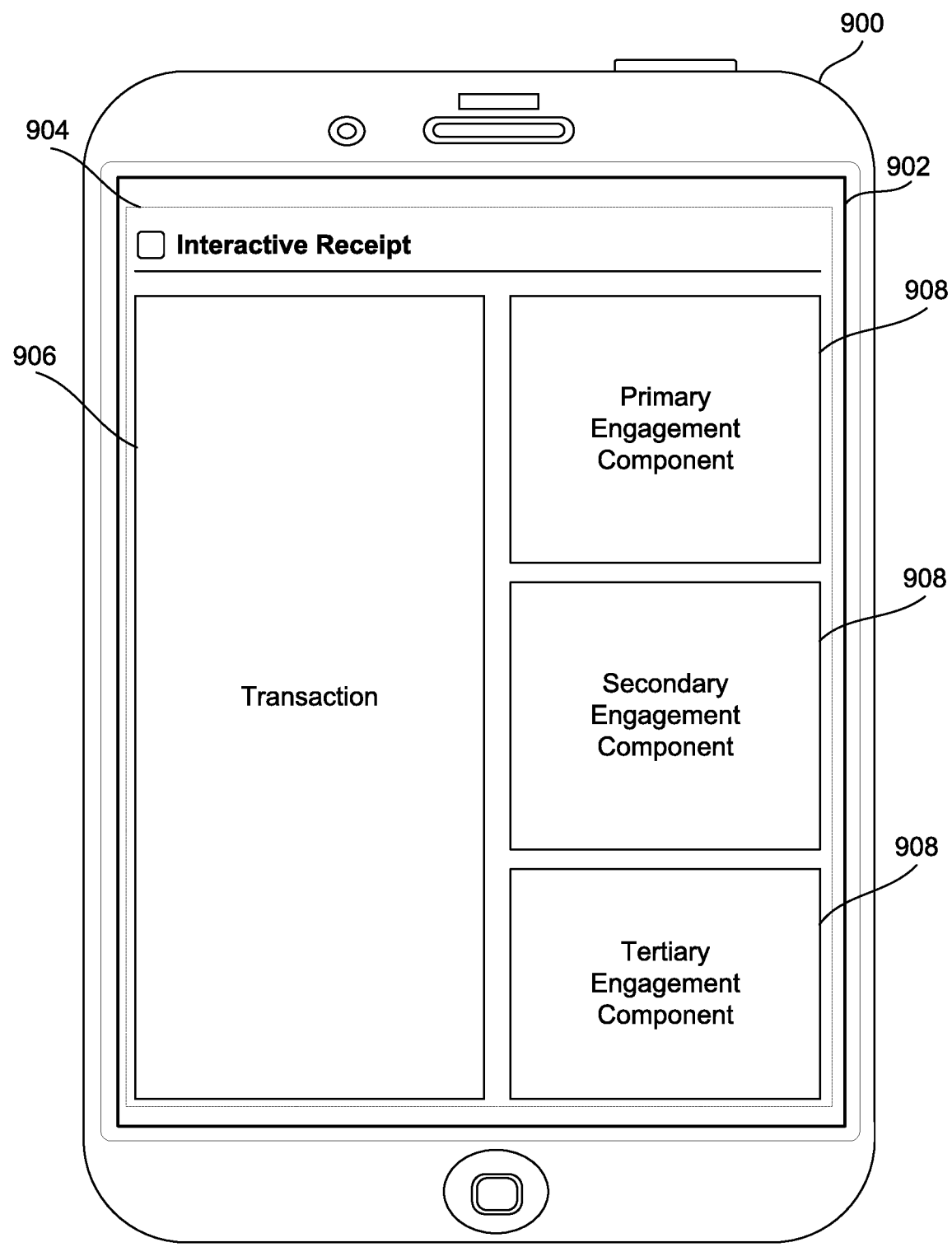
FIGS. 9A-9C illustrate example interfaces of an interactive digital receipt to indicate the employees likely to have assisted the user.

FIG. 9A illustrates a first embodiment of an interactive digital receipt technique implemented on a customer device 900. As used herein, the term "customer device" refers to any general-purpose computing device capable of data processing. In one example, the customer device can be a mobile device, such as a smartphone (e.g., iPhone®, Android®-enabled phone, etc.), a personal digital assistant (PDA), a tablet, an e-reader, or other mobile or portable computing devices. In another example, the customer device can be a personal computing device, such as a desktop, a laptop, or other wired and wireless personal computers. The customer device 900 is equipped with a display screen 902 for displaying various customer interfaces to enable a customer to interact with content generated by the customer device 900.

The customer device 900 can implement an application, such as an interactive receipt mobile application for use by a mobile customer, where the interactive receipt mobile application includes one or more customer interface components. As used herein, a "customer interface component" is a component of a customer interface intended for a customer to view and interact with an interactive digital receipt 904. The interactive digital receipt 904 is generated for the customer after an occurrence of a financial transaction between the customer and a merchant (e.g., payment that occurs at the completion of a service and/or tendering of goods), where the interactive digital receipt 904 is displayed on the display screen 902 of the customer device 900. It is noted that the interactive digital receipt 904 may take up an entirety or any portion of the display screen 902. The interactive digital receipt 904 includes various interactive components, such as a customer transaction interface component 906 ("transaction component") and one or more customer engagement interface components 908 ("engagement component"). The transaction component 906 displays details associated with a particular transaction between the customer and the merchant, where the transaction details are displayed in real time in response to an occurrence of the particular transaction (e.g., payment transaction at the completion of a service). For example, when the customer has made a payment to the merchant, the interactive digital receipt is automatically generated on the customer device 900, and included on the receipt are details of the purchased items and prices generated by the transaction component 906.

The one or more engagement components 908 displays in real time one or more features for the merchant and the customer to interact or engage with one another. In one implementation, the features generated are configured to be available via the interactive digital receipt only within a predefined time period. The predefined time period is configurable by the merchant and allows the merchant to provide time-based incentives to engage the customer to interact with the merchant. In other implementations, the features generated can be accessed at any time.

The engagement component 908 can include a tipping feature that allows the customer the option to select or even add a gratuity amount (i.e., "tip") after the occurrence of a particular transaction with a merchant (e.g., tendering or completion of a payment for goods and/or service); such a transaction may be, for example, payment for a meal at a restaurant visit, where the customer is able to leave a tip after he/she has left the restaurant or within a time frame. The tipping feature enables any tip selected or added by the customer to be directly transmitted to the payment system, without any human interference. For example, after the customer has tendered his credit card to the merchant to pay for a meal, the interactive digital receipt is generated on the customer's mobile device. Using the mobile device, the customer can then proceed to add a tip by selecting a tip amount from amongst recommended options as per dynamic tip generator, and such tip (e.g., credit card authorization of the tip) is directly sent to the payment system to be added together with the already authorized payment amount, without the merchant having to physically enter and submit the tip authorization to the payment system.

The interactive digital receipt 904 can also include an engagement or interactive component that contains a feedback feature either at the time of transaction or within a period of time after the time of transaction. The feedback feature allows the customer (i.e., payer, consumer, or the like) to submit feedback after the completion of a particular transaction with a merchant (i.e., payee). The feedback may include conditions or weight to the tip determinants to be set in the payment processing system to apply in all subsequent payment transactions. The feedback may also include submitting, for example, a rating (e.g., 5 stars), a review, a suggestion, or the like, on various aspects of the transaction (e.g., store cleanliness, service, products, overall visit satisfaction, reason for selective tipping, etc.). In some embodiments, the feedback is submitted directly to the merchant. In some embodiments, the payment processing system coordinates, communicates, and links with third party services associated with the merchant in implementing the feedback feature. In such embodiments, the feedback is transmitted to the third party services upon submission via the interactive digital receipt. The third-party services aggregate the feedback in association with other feedback provided by the merchant.

The interactive digital receipt 904 may also include an engagement or interactive component for generating a promotional reward feature. The promotional reward feature allows a particular merchant to engage and incentivize a customer to interact with the merchant within a predefined time period, or timeframe. In some embodiments, the timeframe associated with the promotional reward feature ("promotion timeframe") is configured to be the same as the timeframe associated with the feedback feature ("feedback timeframe"), or the timeframe associated with the tipping feature ("tipping timeframe"), or both. For example, the timeframe may be set at one hour, and at the expiration of the hour, the promotional reward feature, the feedback feature, and the tipping feature are all made unavailable to the customer.

Other engagements, or interactive components may also be implemented via the interactive digital receipt displayed on the customer device. In one embodiment, the engagement includes an interactive transaction record. The interactive transaction record includes one or more interactive digital receipts that resulted from one or more financial transactions belonging to the customer. A particular interactive record may be configured to include only interactive digital receipts associated with a particular merchant. A particular interactive record may be configured to include all interactive digital receipts associated with the customer, including receipts associated with different merchants with whom the customer has transacted. The interactive transaction record allows the customer to organize his/her interactive digital receipts and provides a comprehensive view of all payment transactions.

In one embodiment, the engagement includes an interactive advertisement component (e.g., promotion for product and/or service) to catch the customer's attention using advertisement with various content. Such advertisement may include, for example, the promotional reward feature to entice the customer to "click-on" or select a particular offering being displayed on the display screen. In yet another example, the advertisement may be a plain display with no interaction required from the customer, where the interaction comes from the advertisement content changing to attract the customer's attention. The advertisement content may be related to the completed transaction for which the receipt 904 is generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record. The advertisement or content information allows customer to make more informed choices with regards to tipping. For example, knowing the number of steps and individuals involved in bringing dinner items from farm to table can encourage the customer to tip higher. Other customer engagements (or interactive components) not discussed above, but consistent with the techniques discussed throughout, may also be envisioned by one of ordinary skill in the art.

One of the other components includes "employee feedback" that generates a list of employees who are likely to have assisted the customer. In one implementation, the interface may only be visible to the merchant.

Figure 9B:
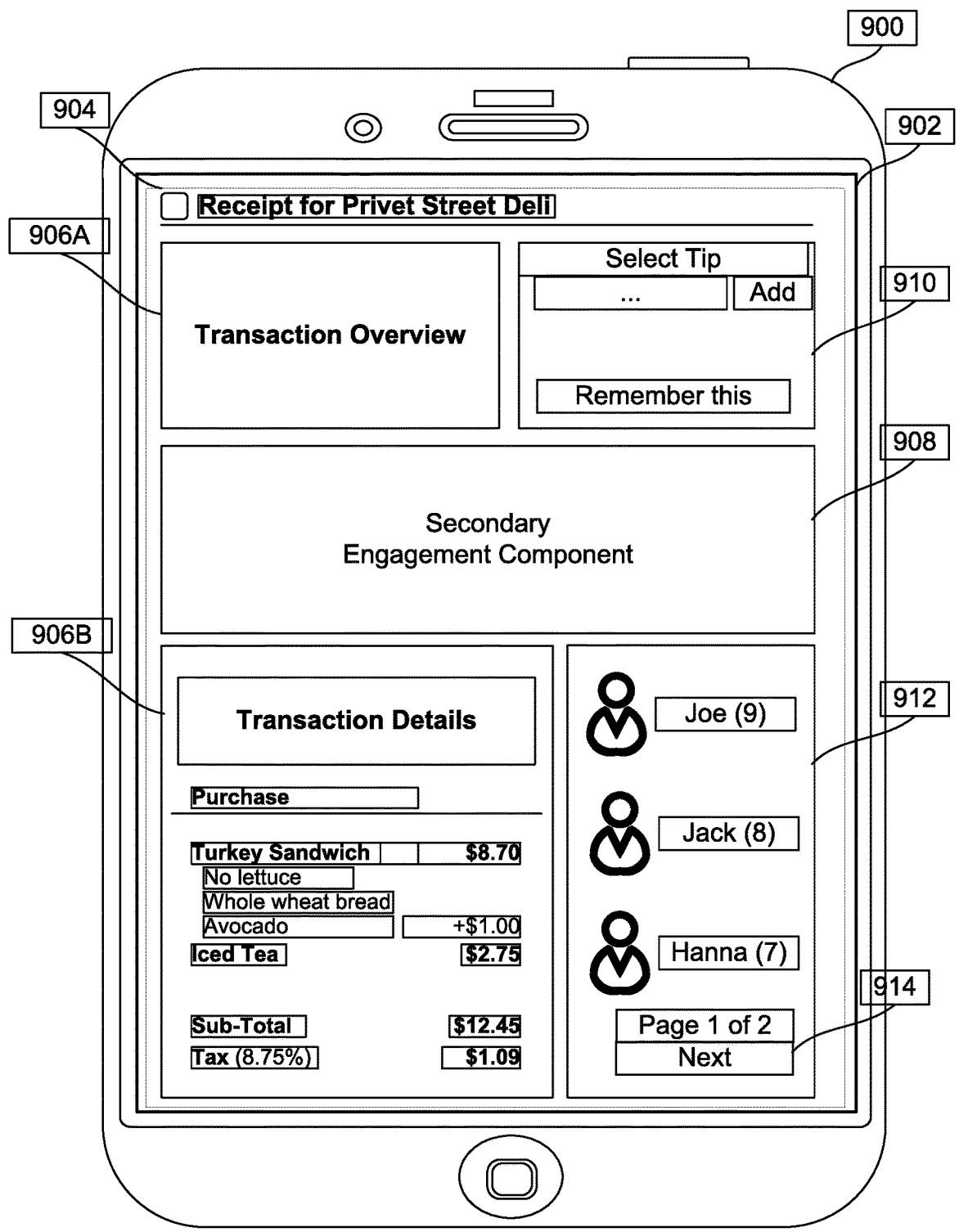

FIG. 9B shows the interactive digital receipt 904 can include a set of transaction components 906A, 906B, in addition to the tipping feature 910 and the feedback feature in 912. The transaction component 906A includes an overview of the transaction completed between the customer and the merchant, such as the total amount of the transaction, the payment card used for the transaction (e.g., last four digits of a credit card), the date, or the like. The transaction component 906B includes the details of the transaction, such as the name of the items purchased, the quantity, the price, or the like. In some implementations, each item may have a separate tip percentage associated with it so that the customer can decide if they want to tip on certain items or not. Further, some items may carry a higher tip than others. In this illustration, this is shown with stars against an item. Since iced team is starred, only iced tea gets tipped. Again, the tip amount may be determined based on the dynamically changing tipping behavior associated with tip determinants.

The tipping feature 910 indicates the configurable tip or user provided tip. The feedback component 912 indicates a list of employees likely to have assisted the customer. The employee list is obtained based on user's movement with respect to the employees within the store and/or interaction time between the user and the employee. As shown, the employees may be arranged in the order of confidence scores (as indicated in parenthesis in figures) and may extend to several pages as shown in 914. In one example, a subsequent page may be shown or generated if the user does not select any employee on the first page.

Figure 9C:
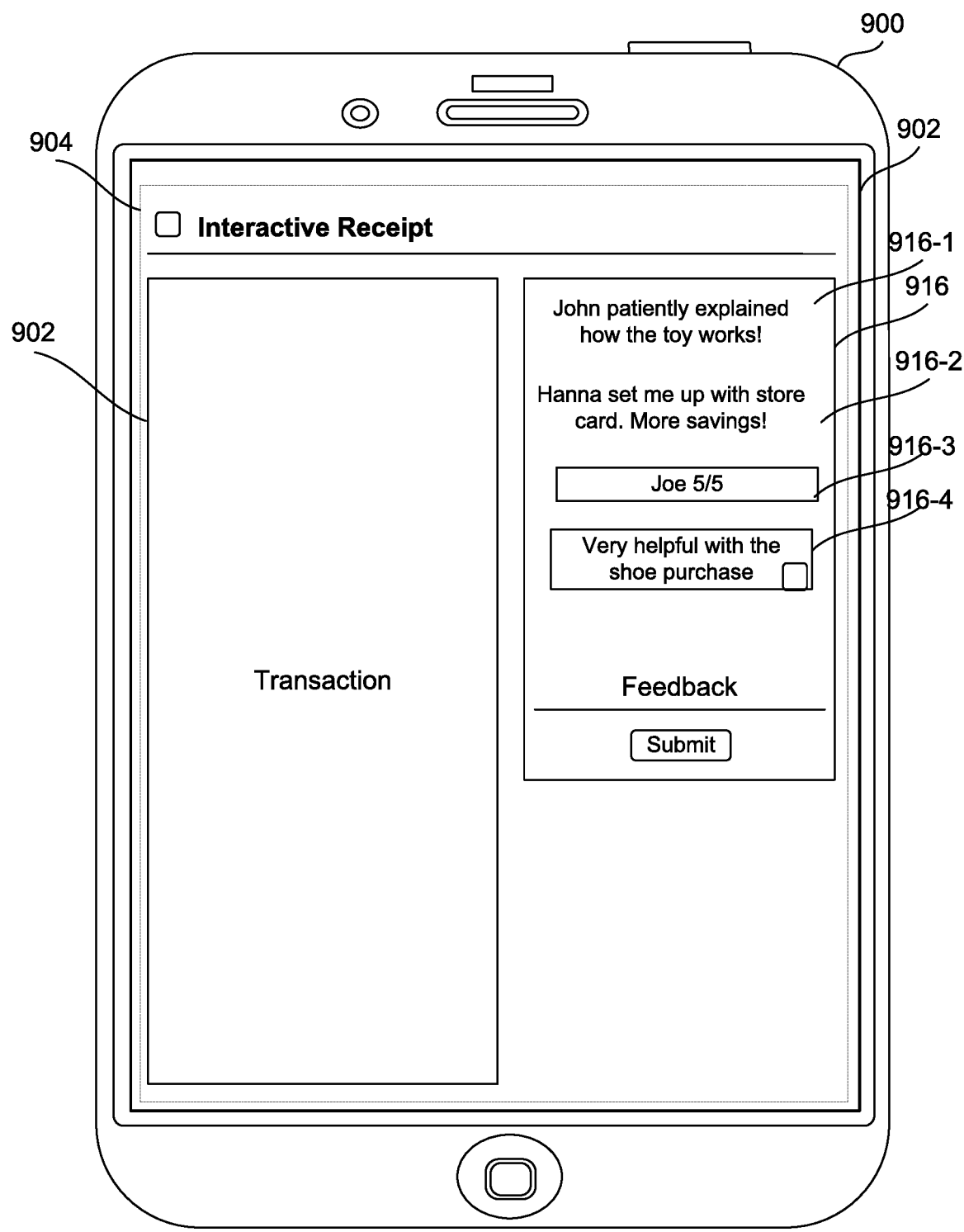

FIG. 9C shows the interactive digital receipt 904 can include two transaction components 906 in addition to the feedback feature 916, and as indicated by various ways 916-1-916-4. The feedback feature 916 shows the feedback provided by the customer, selected by the customer from a set of blanket language or configured based on the items being purchased by the user. The feedback 916-4 can also be auto-generated for selection by the user based on contextual information, such as the item purchased, the interaction time, etc. For example, the payment system may determine an employee, Joe, had the highest confidence score associated with the customer shoe purchase, and also interacted with the customer for a long time, so as to generate prefilled feedback 916-4, which includes a positive statement about the transaction that can be selected by the customer.

According to an implementation, the engagement component described above with reference to FIGS. 9A, 9B, and 9C can include a selection of employees that may have interacted with the user or otherwise be relevant to user based on the retail experience. The user may be presented with a list of employees based on current and past retail experiences. The user may also be requested to enter the name of an employee or feedback corresponding to an employee they name or the ones that are listed on the interface. The selection of employees is described with referenced to other figures. The employees may be arranged in a grid-like manner or list-like manner. The selection of employees can extend over multiple pages, where each page may reveal itself after the user submits "next." The employees relevant to the user may be arranged in the order of relevance, alphabetical names, interaction time, or any other factor. The picture, name or any other identifier of the name may be included. Furthermore, the pictures may be bigger for employees associated with higher confidence score versus employees with lower scores to visually allow the user to focus on employees at the employees with higher confidence scores. It will be understood that the interactive digital receipt can be sent to the user on their device or presented to the user on the POS terminal.

The order of interactive components on the interface can be adjusted as per customer or merchant preferences. For example, the merchant can opt to show the tip amounts before the cart value is presented or before the feedback option is provided. Further, the components can be turned on or off in a setting menu.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:
1. An electronic device comprising:
a display;
one or more processors communicatively coupled the display; and
memory communicatively coupled to the one or more processors and storing instructions that, when executed by the one or more processors, cause the one or more processors to:
receive an indication of a payment transaction involving a user purchasing an item;

identify, from a geographical region surrounding a current geographical location of the user, one or more portions of the geographical region that are deemed to have more than a threshold level of interest to the user due to at least one of a frequency of visits by at least one of the user or at least one other user or a location of the item within a store;

identify employees that are located within the one or more portions of the geographical region;

receive location data from a user device associated with the user, the location data including one or more locations of the user device over time;

establish a wireless leash between the user device and an employee device associated with an employee of the employees;

determine, based at least in part on the location data and establishing the wireless leash, that the employee of the employees interacted with the user more than a threshold amount of times;

determine, utilizing a predictive model, a confidence score for the employee, the confidence score indicating a likelihood that the employee interacted with the user;

determine that the confidence score associated with the employee is equal to or greater than a threshold confidence score;

select the employee from amongst the employees based at least in part on determining that the employee interacted with the user more than the threshold amount of times and determining that the confidence score associated with the employee is equal to or greater than the threshold confidence score;

cause display of, via the display, an interactive digital receipt that includes:
information related to the employee and information related to at least a subset of the employees, the information related to the employee being displayed first in an ordered list before the information related to the subset of the employees, the information including first information associated with the employee that is displayed larger than second information associated with another employee of the subset of the employees based at least in part on the employee having a higher confidence score than the other employee; and cause display of, via the display, a virtual map of the geographical region, the virtual map including a graphical representation of the one or more portions of the geographical region and the employees that are located within the one or more portions of the geographical region.

2. The electronic device of claim 1, wherein the virtual map includes information identifying a level of interest for each of the employees within the one or more portions of the geographical region.

3. The electronic device of claim 1, wherein the virtual map includes information designating a boundary for each of the one or more portions of the geographical region.

4. The electronic device of claim 1, wherein the one or more portions of the geographical region are deemed to have more than the threshold level of interest to the user due to a frequency of visits by the at least one other user, the at least one other user having a threshold level of similarity to the user.

5. The electronic device of claim 1, wherein the one or more portions of the geographical region are determined based on at least one of purchase history for the user or an interaction history of the employee.

6. The electronic device of claim 1, wherein the one or more portions of the geographical region are determined based on an interaction time between the user and the employee, a current speed of the user device, or a current direction of travel of the user device.

7. The electronic device of claim 1, wherein establishing the wireless leash includes sending one or more signals between the electronic device and the employee device.

8. The electronic device of claim 1, wherein the instructions further cause the one or more processors to:
determine, based at least in part on the location data, that the user is located within a first portion of the geographical region;
identify a first employee located within the first portion of the geographical region;
send information associated with the first employee to the user device based at least in part on determining that the user is located within the first portion and identifying the first employee;
determine, based at least in part on the location data, that the user is located within a second portion of the geographical region that is different than the first portion;
identify a second employee located within the second portion of the geographical region; and
send information associated with the second employee to the user device based at least in part on determining that the user is located within the second portion and identifying the second employee.

9. The electronic device of claim 1, wherein the graphical representation is a first graphical representation and the virtual map further includes a second graphical representation of one or more interactions that occurred between the user and the employee, the second graphical representation being displayed at one or more locations associated with the one or more interactions.

10. The electronic device of claim 1, wherein the subset of the employees is a first subset of the employees and the instructions further cause the one or more processors to:
determine, utilizing the predictive model, confidence scores for a second subset of the employees;
determine that the confidence scores associated with the second subset of the employees are below the threshold confidence score; and
preventing display of information related to the second subset of the employees based at least in part on determining that the confidence scores associated with the second subset of the employees are below the threshold confidence score.

11. A method implemented at least in part by a payment processing system, the method comprising:
receiving an indication of a payment transaction involving a user purchasing an item;
identifying, from a geographical region surrounding a current geographical location of the user, one or more portions of the geographical region that are deemed to have more than a threshold level of interest to the user due to at least one of a frequency of visits by at least one of the user or at least one other user or a location of the item within a store;
identifying employees that are located within the one or more portions of the geographical region;
receiving location data from a user device associated with the user, the location data including one or more locations of the user device over time;

establishing a wireless leash between the user device and an employee device associated with an employee of the employees;

determining, based at least in part on the location data and establishing the wireless leash, that the employee of the employees interacted with the user more than a threshold amount of times;

determining, utilizing a predictive model, a confidence score for the employee, the confidence score indicating a likelihood that the employee interacted with the user;

determining that the confidence score associated with the employee is equal to or greater than a threshold confidence score selecting the employee from amongst the employees based at least in part on determining that the employee interacted with the user more than the threshold amount of times and determining that the confidence score associated with the employee is equal to or greater than the threshold confidence score;

causing display of, via a display, an interactive digital receipt that includes:
information related to the employee and information related to at least a subset of the employees, the information related to the employee being displayed first in an ordered list before the information related to the subset of the employees, the information including first information associated with the employee that is displayed larger than second information associated with another employee of the subset of the employees based at least in part on the employee having a higher confidence score than the other employee; and cause display of, via the display, a map of the geographical region, the map including a graphical representation of the one or more portions of the geographical region, and the employees that are located within the one or more portions of the geographical region.

12. The method of claim 11, wherein the map includes information identifying a level of interest for each of the employees within the one or more portions of the geographical region.

13. The method of claim 11, wherein the map includes a boundary for each of the one or more portions of the geographical region.

14. The method of claim 11, wherein the one or more portions of the geographical region are deemed to have more than the threshold level of interest to the user due to a frequency of visits by the at least one other user, the at least one other user having a threshold level of similarity to the user.

15. The method of claim 11, wherein the one or more portions of the geographical region are determined based on at least one of purchase history for the user or an interaction history of the employee.

16. The method of claim 11, wherein the one or more portions of the geographical region are determined based on an interaction time between the user and the employee, a current speed of the user device, or a current direction of travel of the user device.

17. A system comprising:
one or more processors; and
memory communicatively coupled to the one or more processors and storing instructions that, when executed by the one or more processors, cause the processors to:
receive an indication of a payment transaction involving a user purchasing an item;
identify, from a geographical region surrounding a current geographical location of the user, one or more portions of the geographical region that are deemed to have more than a threshold level of interest to the user due to at least one of a frequency of visits by at least one of the user or at least one other user or a location of the item within a store;

identify employees that are located within the one or more portions of the geographical region;

receive location data from a user device associated with the user, the location data including one or more locations of the user device over time;

establish a wireless leash between the user device and an employee device associated with an employee of the employees;

determine, based at least in part on the location data and establishing the wireless leash, that the employee of the employees interacted with the user more than a threshold amount of times;

determine, utilizing a predictive model, a confidence score for the employee, the confidence score indicating a likelihood that the employee interacted with the user;

determine that the confidence score associated with the employee is equal to or greater than a threshold confidence score select the employee from amongst the employees based at least in part on determining that the employee interacted with the user more than the threshold amount of times and determining that the confidence score associated with the employee is equal to or greater than the threshold confidence score;

cause display of, via a display, an interactive digital receipt that includes:
information related to the employee and information related to at least a subset of the employees, the information related to the employee being displayed first in an ordered list before the information related to the subset of the employees, the information including first information associated with the employee that is displayed larger than second information associated with another employee of the subset of the employees based at least in part on the employee having a higher confidence score than the other employee; and cause display of, via the display, a map of the geographical region, the map including a graphical representation of the one or more portions of the geographical region and the employees that are located within the one or more portions of the geographical region.

18. The system of claim 17, wherein the one or more portions of the geographical region are deemed to have more than the threshold level of interest to the user due to a frequency of visits by the at least one other user, the at least one other user having a threshold level of similarity to the user.

19. The system of claim 17, wherein the one or more portions of the geographical region are determined based on at least one of purchase history for the user or an interaction history of the employee.

20. The system of claim 17, wherein the one or more portions of the geographical region are determined based on an interaction time between the user and the employee, a current speed of the user device, or a current direction of travel of the user device.

* * * * *